US010697881B2

(12) United States Patent
Harris

(10) Patent No.: US 10,697,881 B2
(45) Date of Patent: Jun. 30, 2020

(54) CRASH PROTECTED SAMPLER FOR FLOW CYTOMETER

(71) Applicant: Bio-Rad Laboratories, Inc., Hercules, CA (US)

(72) Inventor: Rodney C. Harris, Fort Collins, CO (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 544 days.

(21) Appl. No.: 15/428,989

(22) Filed: Feb. 9, 2017

(65) Prior Publication Data

US 2017/0241886 A1    Aug. 24, 2017

Related U.S. Application Data

(60) Provisional application No. 62/297,058, filed on Feb. 18, 2016.

(51) Int. Cl.
| | | |
|---|---|---|
| *G01N 35/10* | (2006.01) | |
| *G01N 1/10* | (2006.01) | |
| *G01V 8/12* | (2006.01) | |
| *G01N 15/10* | (2006.01) | |
| *G01N 15/00* | (2006.01) | |

(52) U.S. Cl.
CPC ............... *G01N 15/10* (2013.01); *G01N 1/10* (2013.01); *G01N 35/1004* (2013.01); *G01N 35/1011* (2013.01); *G01V 8/12* (2013.01); *G01N 2015/0065* (2013.01); *G01N 2015/1006* (2013.01)

(58) Field of Classification Search
None
See application file for complete search history.

(56) References Cited

U.S. PATENT DOCUMENTS

| | | |
|---|---|---|
| 3,719,086 A | 3/1973 | Bannister et al. |
| 4,098,305 A | 7/1978 | Gates |
| 5,592,959 A | 1/1997 | Nagai |
| 5,603,342 A | 2/1997 | Shambaugh |
| 6,171,280 B1 | 1/2001 | Imazu et al. |
| 2001/0021354 A1 | 9/2001 | Lang |
| 2003/0054543 A1 | 3/2003 | Lafferty |
| 2005/0074363 A1* | 4/2005 | Dunfee ............. G01N 35/1004 422/81 |

(Continued)

FOREIGN PATENT DOCUMENTS

| | | |
|---|---|---|
| JP | 968536 | 3/1997 |
| WO | 2017/143228 | 8/2017 |

OTHER PUBLICATIONS

International Preliminary Report on Patentability dated Aug. 30, 2018 issued in PCT/US2017/018430.

(Continued)

*Primary Examiner* — Jill A Warden
*Assistant Examiner* — Brittany I Fisher
(74) *Attorney, Agent, or Firm* — Weaver Austin Villeneuve & Sampson LLP

(57) ABSTRACT

Disclosed is a sampler that obtains fluid samples with a probe and washes the probe during the act of withdrawing the probe from a sample container. In addition, detection of a collision of the probe and/or the wash station with another object can be quickly detected using sensors that determine if a collision situation exists.

18 Claims, 25 Drawing Sheets

(56) References Cited

U.S. PATENT DOCUMENTS

| | | | |
|---|---|---|---|
| 2008/0257390 A1* | 10/2008 | Lee ..................... | G01N 35/025 |
| | | | 134/56 R |
| 2009/0032064 A1* | 2/2009 | Gifford .................. | B08B 3/044 |
| | | | 134/18 |
| 2011/0274584 A1* | 11/2011 | Kitamura ........... | G01N 35/1004 |
| | | | 422/63 |
| 2011/0293474 A1* | 12/2011 | Sugimura .......... | G01N 35/1004 |
| | | | 422/62 |
| 2012/0138099 A1 | 6/2012 | Jafari et al. | |
| 2013/0340795 A1 | 12/2013 | Gaskill-Fox et al. | |
| 2014/0037503 A1* | 2/2014 | Sakashita ........... | G01N 35/1004 |
| | | | 422/81 |
| 2014/0178251 A1* | 6/2014 | Yamada ............. | G01N 35/1002 |
| | | | 422/67 |
| 2015/0192601 A1* | 7/2015 | Cohen ................ | G01N 35/1004 |
| | | | 134/6 |

OTHER PUBLICATIONS

International Search Report and Written Opinion—PCT/US17/18430—ISA/US—Jun. 8, 2017.
Extended European Search Report dated Sep. 23, 2019 issued in European Application No. 17753950.9.

\* cited by examiner

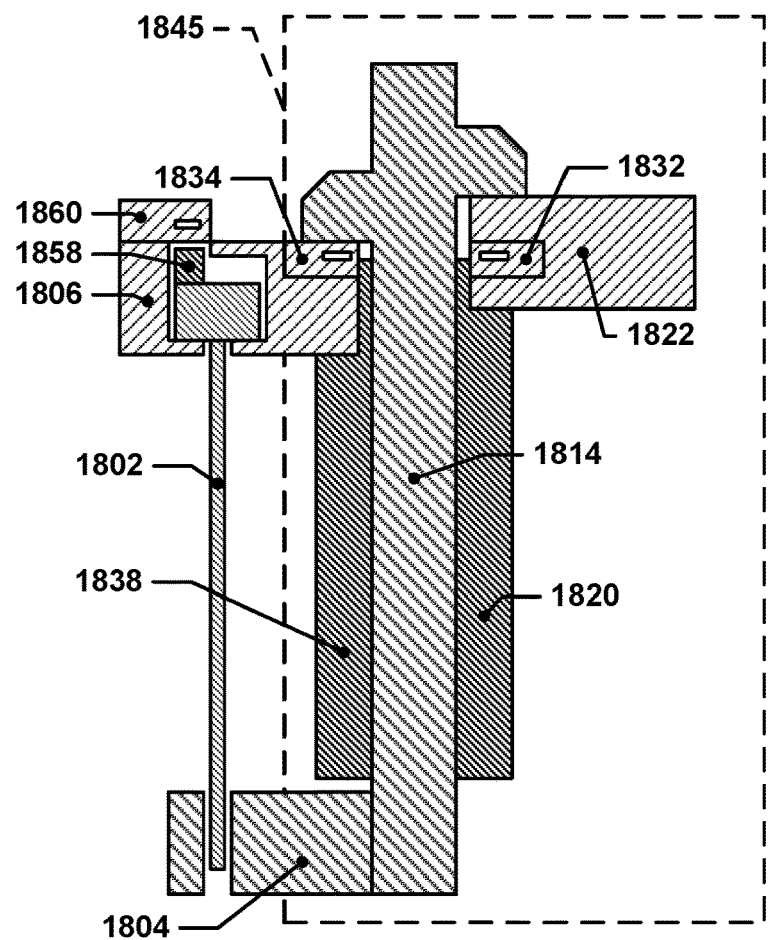
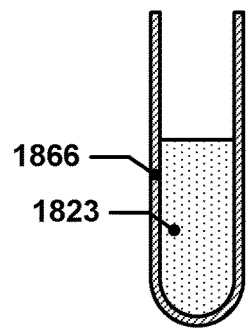
Figure 18

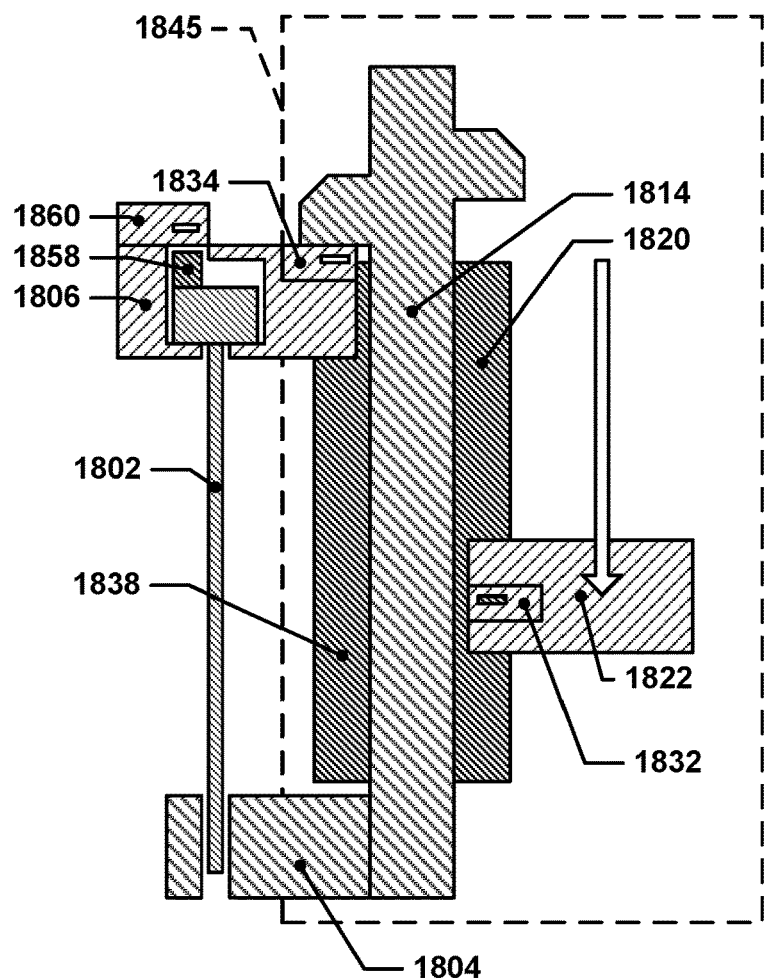
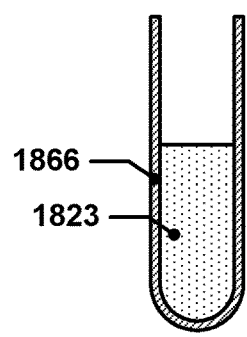
Figure 19

CRASH PROTECTED SAMPLER FOR FLOW CYTOMETER

CROSS REFERENCE TO RELATED APPLICATIONS

This application claims benefit of priority under 35 U.S.C. § 119(e) to U.S. Provisional Patent Application No. 62/297,058, filed Feb. 18, 2016 and titled "CRASH PROTECTED SAMPLER FOR FLOW CYTOMETER," which is hereby incorporated by reference herein in its entirety.

BACKGROUND

Flow cytometers are useful devices for analyzing and sorting various types of particles in fluid streams. These cells and particles may be biological or physical samples that are collected for analysis. The particles may comprise biological cells, calibration beads, physical sample particles, or other particles of interest. Analysis of these particles can provide valuable information to both researchers and clinicians.

SUMMARY

The systems, methods and devices of the disclosure each have several innovative aspects, no single one of which is solely responsible for the desirable attributes disclosed herein. One innovative aspect of the subject matter described in this disclosure can be implemented in a variety of ways.

In some implementations, an apparatus may be provided that includes a base assembly and a sled movably coupled with the base assembly. The sled may be configured to translate relative to the base assembly along a first axis, and may include a wash station with a passage that extends along an axis parallel to the first axis and passes through the wash station. The apparatus may further include a probe holder assembly that is movably coupled with the base assembly and is configured to translate in a first direction relative to the base assembly along the first axis and in a second direction opposite the first direction relative to the base assembly along the first axis, receive a probe such that the probe, when installed in the probe holder assembly, passes through the passage in the wash station during at least some translation along the first axis of the probe holder assembly relative to the sled, and prevent the sled from moving past a first bottomed-out position relative to the probe holder assembly when the sled is translated in the first direction relative to the probe holder assembly. The apparatus may also include a z-gauge assembly movably coupled with the base assembly and configured to translate relative to the base assembly along the first axis and prevent the sled from moving past a second bottomed-out position relative to the z-gauge assembly when the sled is translated in the first direction along the first axis relative to the z-gauge assembly. The apparatus may also include a probe holder sensor configured to detect when the sled is in the first bottomed-out position relative to the probe holder assembly and a z-gauge sensor configured to detect when the sled is in the second bottomed-out position relative to the z-gauge assembly. The term "sled," as used herein, is used to refer to a structure that comports with the description herein, e.g., one that translates linearly relative to the base assembly and that supports the wash station.

In some implementations, the apparatus may further include a probe holder assembly linear actuator that is configured to cause the probe holder assembly to translate along the first axis responsive to input from a probe holder assembly drive mechanism, and a z-gauge assembly linear actuator that is configured to cause the z-gauge assembly to translate along the first axis.

In some further such implementations, the apparatus may further include a probe crash sensor located in the probe holder assembly and configured to detect when the probe, when the probe is installed in the probe holder assembly, moves at least a first distance relative to the probe holder assembly.

In some some additional such implementations, the probe crash sensor may be an optical sensor that includes a light source and a photodetector and configured to direct light from the light source towards the photodetector by crossing a gap, the probe holder assembly may further include a probe adapter that is configured to mate with the probe when the probe is installed, and the probe adapter may include a probe crash flag that does not block light from the light source of the probe crash sensor from reaching the photodetector of the probe crash sensor when the probe adapter is in a lowered position relative to the probe holder assembly and that blocks light from the light source of the probe crash sensor from reaching the photodetector of the probe crash sensor when the probe adapter is in a raised position relative to the probe holder assembly.

In some implementations of the apparatus, the apparatus may further include a controller, the controller including one or more processors and a memory. The one or more processors may be operatively connected with the memory and the memory may store computer-executable instructions for controlling the one or more processors to monitor signals from the crash probe sensor and generate a probe drive control signal to cause the probe holder assembly linear actuator to translate the probe holder assembly upwards responsive to the signals from the crash probe sensor indicating that the probe has moved relative to the probe holder assembly.

In some implementations of the apparatus, the apparatus may further include a controller including one or more processors and a memory. The one or more processors may be operatively connected with the memory and the memory may store computer-executable instructions for controlling the one or more processors to: monitor signals from the probe holder sensor, monitor signals from the z-gauge sensor, and generate a z-gauge drive control signal to cause the z-gauge linear actuator to translate the z-gauge assembly upwards responsive to the signals from the probe holder sensor and the z-gauge sensor indicating that the sled is in neither the first bottomed-out position nor the second bottomed-out position.

In some further such implementations, the memory may further store computer-executable instructions for further controlling the one or more processors to generate an error signal responsive to the signals from the probe holder sensor and the z-gauge sensor indicating that the sled is in neither the first bottomed-out position nor the second bottomed-out position.

In some implementations, the apparatus may further include a user input device, and the memory may store further computer-executable instructions for further controlling the one or more processors to receive a user input signal from the user input device indicative of a particular sample tube size, access a database of sample tube information, determine, from the database of sample tube information, a z-gauge height setting and a probe holder assembly height setting for the particular sample tube size from the database of sample tube information, generate a z-gauge drive control signal to cause the z-gauge linear actuator to move the z-gauge assembly to a first height corresponding to the z-gauge height setting, and generate, subsequent to causing the z-gauge linear actuator to move to the z-gauge assembly to the first height, a probe drive control signal to cause the probe holder assembly linear actuator to move the probe holder assembly to a second height corresponding to the probe holder assembly height.

In some implementations of the apparatus, the probe holder assembly linear actuator may include a z-gauge drive screw configured to translate the z-gauge assembly relative to the base assembly when rotated and a z-gauge drive screw motor configured to rotate the z-gauge drive screw responsive to receipt of a z-gauge control signal, and the z-gauge assembly linear actuator may include a probe drive screw configured to translate the probe holder assembly relative to the base assembly when rotated and a probe drive screw motor configured to rotate the probe drive screw responsive to receipt of a probe drive control signal.

In some implementations of the apparatus, the probe holder sensor and the z-gauge sensor may both be optical sensors, each optical sensor including a light source and a photodetector and configured to direct light from the light source towards the photodetector by crossing a gap. In such implementations, the apparatus may further include a probe holder flag that blocks light from the light source of the probe holder sensor from reaching the photodetector of the probe holder sensor except when the sled is in the first bottomed out position and a z-gauge flag that blocks light from the light source of the z-gauge sensor from reaching the photodetector of the z-gauge sensor except when the sled is in the second bottomed out position.

In some implementations of the apparatus, the wash station may include a wash fluid inlet; a wash fluid exit nozzle; a wash chamber; and a probe opening. The passage may include the wash chamber and the probe opening, the wash fluid inlet may be configured to direct fluid flowed through the wash fluid inlet into the wash chamber along a direction offset from a centerline of the probe when the probe is installed in the probe holder assembly, the wash fluid exit nozzle may be positioned lower than the probe opening, and the probe opening may have a smaller cross-section when viewed along the first axis than the wash chamber.

In some implementations of the apparatus, the apparatus may further include a z-gauge home sensor configured to detect when the z-gauge assembly is at a pre-set home position relative to the base assembly.

In some such implementations, the z-gauge home sensor may be an optical sensor that includes a light source and a photodetector and configured to direct light from the light source towards the photodetector by crossing a gap, and the apparatus may further include a z-gauge home flag that blocks light from the light source of the z-gauge home sensor from reaching the photodetector of the z-gauge home sensor only when the z-gauge assembly is in the pre-set home position relative to the base assembly.

In some implementations, the sled and the probe holder assembly may both be mounted to a linear guide rail.

In some such implementations, the sled may be connected with the linear guide rail by an upper slide, the probe holder assembly may be connected with the linear guide rail by a lower slide, the sled may include an elongate slot with a long axis parallel to the first axis, the sled may be interposed between the linear guide rail and the probe holder assembly, and the lower slide may pass through the elongate slot.

In some implementations, a non-transitory, machine-readable storage medium may be provided that may store computer-executable instructions for causing one or more processors to: send a z-gauge drive signal to a z-gauge linear actuator to cause the z-gauge linear actuator to move a z-gauge assembly of a sampler apparatus to a first height, send a probe drive signal to a probe holder assembly linear actuator to cause the probe holder assembly linear actuator to move a probe holder assembly to a second height, monitor signals from a probe holder sensor, monitor signals from a z-gauge sensor, and send a further z-gauge drive signal to the z-gauge linear actuator to cause the z-gauge linear actuator to move the z-gauge assembly upwards responsive to the signals from the probe holder sensor and the z-gauge sensor indicating that a sled of the sampler apparatus is neither in a first bottomed-out position relative to the probe holder assembly nor in a second bottomed-out position relative to the z-gauge assembly.

In some implementations, the non-transitory, machine-readable storage medium may further store computer-executable instructions for causing one or more processors to monitor signals from a probe crash sensor and send a further probe drive signal to the probe holder assembly linear actuator to cause the probe holder assembly linear actuator to move the probe holder assembly upwards responsive to the signals from the probe crash sensor indicating that a probe of the sample apparatus has moved relative to the probe holder assembly.

In some implementations, the non-transitory, machine-readable storage medium may further store computer-executable instructions for causing one or more processors to receive a user input signal indicative of a particular sample tube size, access a database of sample tube information, and determine, from the database of sample tube information, a z-gauge height setting and a probe holder assembly height setting for the particular sample tube size from the database of sample tube information, wherein the first height corresponds with the z-gauge height setting and the second height corresponds with the probe holder assembly.

BRIEF DESCRIPTION OF THE DRAWINGS

FIG. 18 is a schematic view of an example sampler in a home position.

FIG. 19 is a schematic view of the example sampler of FIG. 18 with the z-gauge assembly set to a specific height.

FIGS. 1 through 17 are drawn to-scale within each Figure, although the scale from Figure to Figure may vary.

DETAILED DESCRIPTION OF THE EMBODIMENTS

Figure 1:
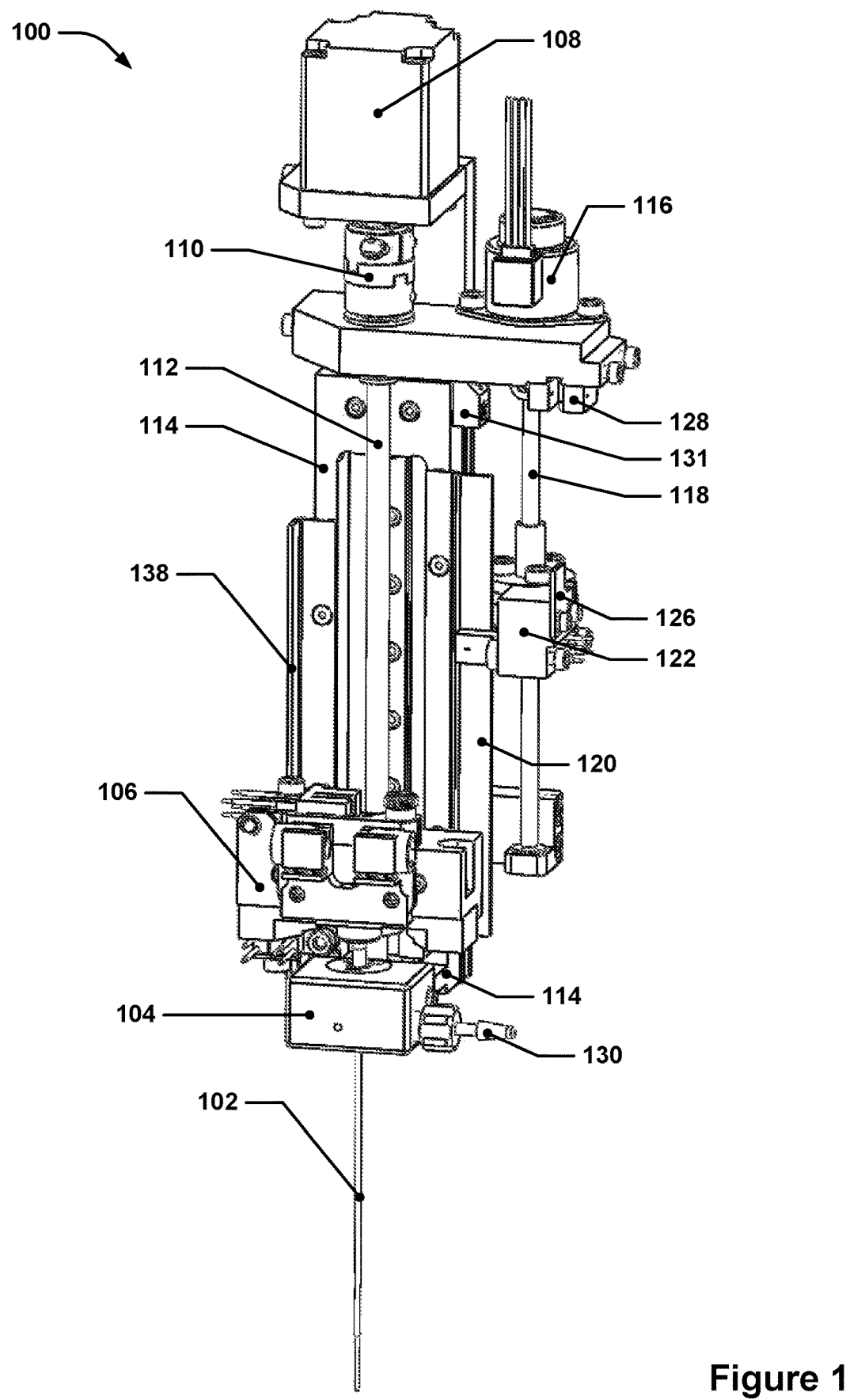
FIG. 1 is a view of an example sampler.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system for obtaining fluid samples from one or more containers.

Discussed herein is a sampler that may be used to obtain samples from one or more sample containers, which may also be referred to herein as sample tubes. The sampler may include at least four major subassemblies—a base assembly, a z-gauge assembly, a probe holder assembly, and a sled. The base assembly may be affixed to a stationary apparatus, such as a flow cytometer or other analysis system that processes fluid samples, and may be fixed with respect to the stationary part of the apparatus or may be movably mounted with respect to the stationary part of the apparatus. In systems in which the base assembly is movably mounted with respect to the stationary part of the apparatus, the base assembly may be connected with the stationary part of the apparatus by a single-axis or dual-axis horizontal drive system to allow the base assembly, for example, to traverse across a multi-well sample plate or other single-dimensional or two-dimensional array or arrangement of sample wells in order to allow the sampler to obtain samples from any of the sample wells. In some other systems, the base assembly may be fixed with respect to the stationary part of the apparatus, and the apparatus may instead be equipped with a single- or two-axis drive system that may be configured to move a single-dimensional or two-dimensional array or arrangement of sample wells back and forth or side-to-side underneath the sampler to allow for samples to be withdrawn from any of the sample wells by the sampler. In some implementations, the apparatus may be equipped with a first single-axis drive system that may move the sampler along a first horizontal axis, and a second single-axis drive system that may move a two-dimensional array of sample wells along another horizontal axis perpendicular to the first horizontal axis.

The z-gauge assembly and the probe holder assembly may both be configured to be independently movable to different elevations, e.g., through the use of drive screws or other linear actuation systems and, in some cases, linear guides that translate such assemblies along a first axis, e.g., a vertical axis. The sled, in turn, may be configured to be supported by one or both of the probe holder assembly or the z-gauge assembly, e.g., the sled may be free to slide downwards along a linear guide rail until it is prevented from descending further by either the probe holder assembly or the z-gauge assembly, or both. When the sled is supported by the probe holder assembly, the relative positioning of the sled with respect to the probe holder assembly may be referred to herein as a "first bottomed-out position," and when the sled is supported by the z-gauge assembly, the relative positioning of the sled with respect to the z-gauge assembly may be referred to herein as the "second bottomed-out position." The sled may support ancillary equipment, such as a wash station that may be configured to wash a probe held by the probe holder assembly.

Such a system may, in many implementations, include various sensors configured to detect various relative positioning states of some or all of the major subassemblies discussed above. In such implementations, the signals from the sensors may be monitored by a controller to identify situations in which there may have been a collision between, for example, the sled and an external object, such as a sample tube, and to take corrective action in such cases.

Various implementations of these concepts are discussed below in more detail with respect to the Figures, although it is to be understood that these are only example implementations. Thus, the teachings are not intended to be limited to the implementations depicted solely in the Figures, but instead have wide applicability as will be readily apparent to one having ordinary skill in the art.

Figure 2:
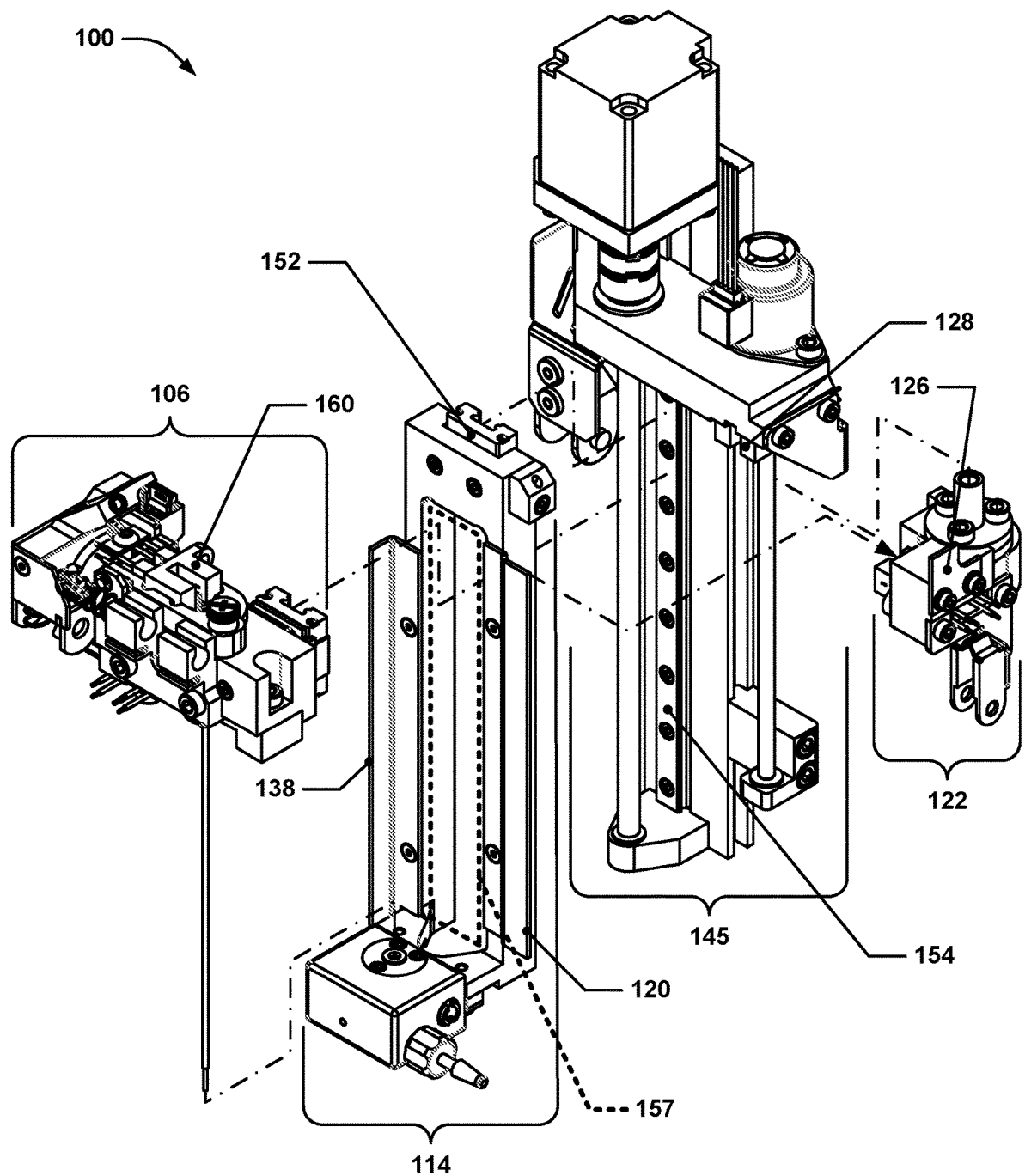
FIG. 2 is an isometric exploded view of an example sampler similar to that of FIG. 1.

FIG. 1 is a view of an implementation of a sampler 100 that may be used in a flow cytometer or other, similar apparatus. FIG. 2 is an isometric exploded view of an example sampler similar to that of FIG. 1, and FIG. 3 is a reverse isometric exploded view of the example sample of FIG. 2 (the implementation of FIGS. 2 and 3 are essentially the same as in FIG. 1, with the exception that component 110 is a different style of coupler, and the probe holder assembly of FIGS. 2 and 3 has some additional components that are shown).

Figure 3:
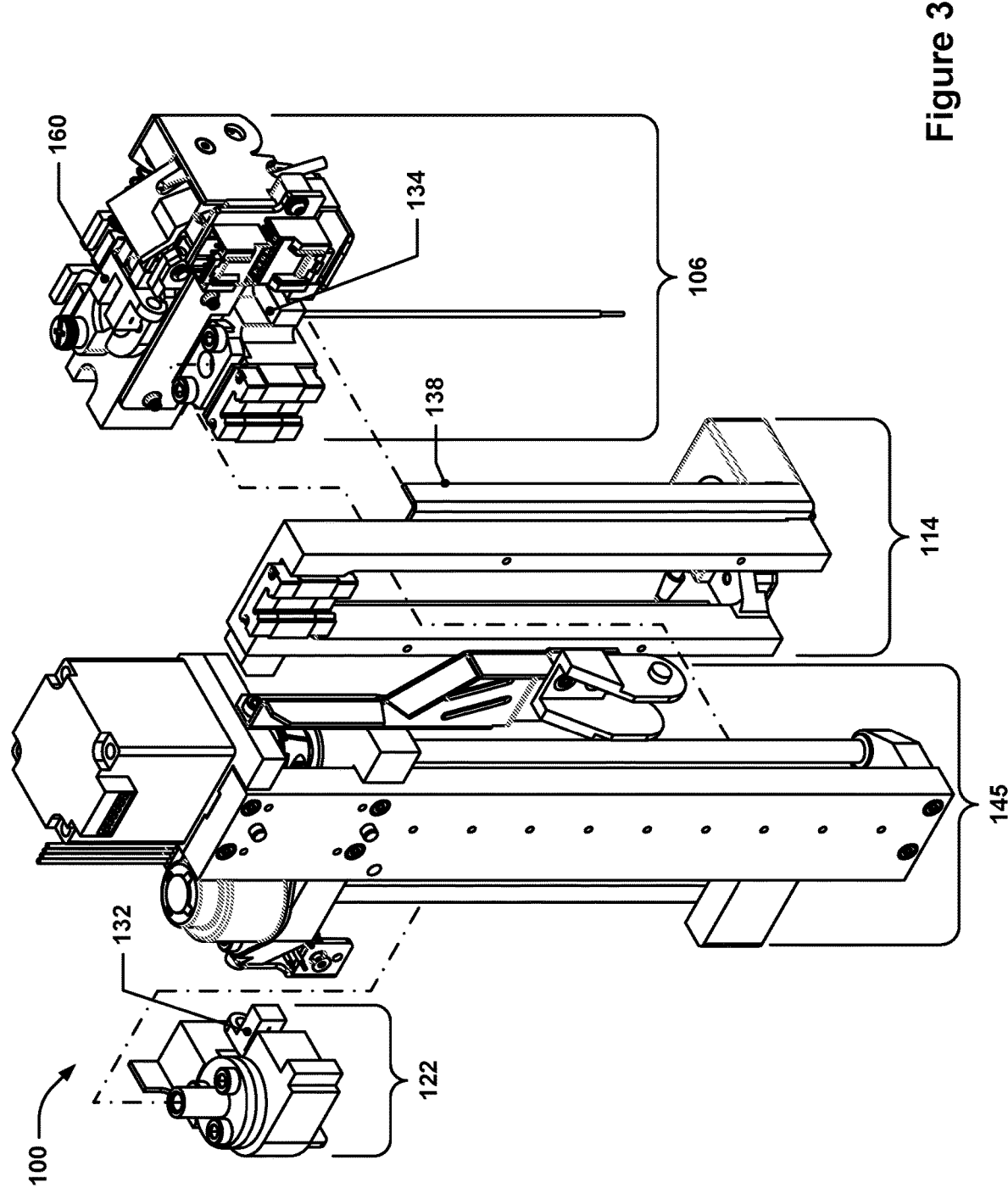
FIG. 3 is a reverse isometric exploded view of the example sample of FIG. 2.

As can be seen in the exploded views shown in FIGS. 2 and 3, the sample 100 may include at least the four major subassemblies discussed above—a base assembly 145, a sled 114, a z-gauge assembly 122, and a probe holder assembly 106.

As illustrated in FIG. 1, the sampler 100 may include a probe 102 that may be used to obtain samples from a well plate or other container, as described in more detail below. The probe may be removable to allow for replacement if the probe gets worn out or damaged. A wash station 104, which is part of the sled 114, surrounds the probe 102 and may be used to wash the probe 102 after the probe 102 has been used to take a sample. Wash fluid may be introduced into the wash station 104 through an inlet, swirled around the probe 102, and flushed out of the wash station 104 via a wash fluid exit nozzle 130. The wash fluid exit nozzle 130 may be connected to a suction system that provides sufficient suction to prevent most or all of the wash fluid from accidentally entering any of the sample wells, as described in more detail below.

The probe 102 may be moved vertically by the probe holder assembly 106 in response to rotation of a probe drive screw 112 that is driven by a probe drive screw motor 108. The probe drive screw motor 108 may rotate a coupling 110, which in turn may rotate the probe drive screw 112 to cause the probe holder assembly 106 to move up or down in a vertical direction. Similarly, a z-gauge drive screw motor 116 may rotate the z-gauge drive screw 118, which may move the z-gauge assembly 122 up or down in a vertical direction. The z-gauge assembly 122 may engage a sled stop 131 on the sled 114 as the z-gauge assembly travels upwards, thereby causing the sled 114 to travel upwards in tandem with the z-gauge assembly during such movement, or as the sled 114 moves downwards, thereby causing the sled 114 to stop (assuming the z-gauge assembly is stationary). Thus, in the second bottomed-out position for this example sampler 100, the sled stop 131 is engaged with the z-gauge assembly 122.

It is to be understood that while drive screws and motors (such as stepper motors), as depicted in the depicted implementation, may provide a reliable and accurate mechanism for providing for linear translation of various assemblies, other linear translation systems may be used in other implementations, such as hydraulic or pneumatic lifts/actuators, rack-and-pinion actuators, cam-driven mechanisms, etc. Such alternate implementations are considered to be within the scope of this disclosure as well.

The sled 114 may be coupled to an upper slide 152 (FIG. 10) that is slidably coupled with a linear guide rail 154 on a base plate 150 of the base assembly 145. Thus, the upper slide 152 (FIG. 10) may freely move along the linear guide rail 154 (FIG. 10) of the base plate 150 so that the sled 114 and the upper slide 152 move downwardly by the force of gravity if not prevented from doing so by another component, e.g., the probe holder assembly 106 (when the sled is in the first bottomed-out position) or the z-gauge assembly 122 (when the sled is in the second bottomed-out position). For example, as noted earlier, the sled stop 131 may engage the z-gauge assembly 122, which may stop the sled 114 and the wash station 104 that is connected to the sled 114 from moving downwardly any farther than the engagement of the sled stop 131 with the z-gauge assembly 122. In this manner, the z-gauge assembly 122 functions to set the lower limit of the movement of the sled 114 and the wash station 104. As explained in more detail below, by setting the lower limit of the movement of the wash station 104, crashes of the wash station 104 with sample tubes and sample well plates can be avoided. A "crash" refers to an unintended collision between a component and some other object, e.g., a sample tube, debris, an operator's hand, etc.

As also shown in FIG. 1, a z-gauge home flag 126 may be connected to the z-gauge assembly 122. As the z-gauge assembly 122 moves upwardly due to rotation of the z-gauge drive screw 118, the z-gauge home flag 126 may interrupt a light beam in a z-gauge home sensor 128, thereby indicating that the z-gauge assembly 122 is in a fully upward and "home" position.

Figure 4:
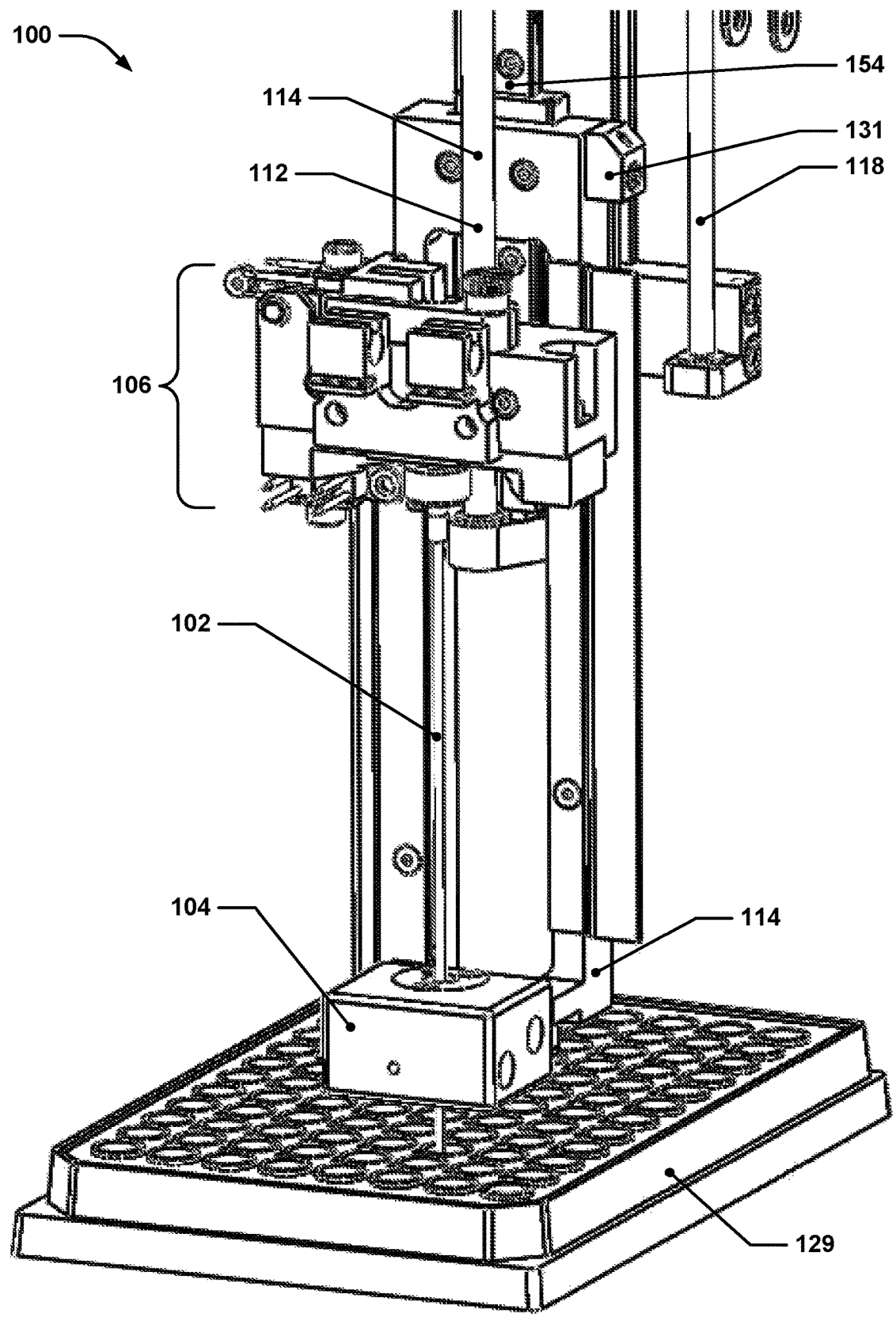
FIG. 4 is a view of the example sampler of FIG. 1 and a sample well plate.

FIG. 4 is another view of the example sampler 100 and also depicts a sample well plate 129. The sample well plate 129 may be filled with samples that may be drawn through the probe 102 into a cell analyzer, cell sorter, or other equipment for analysis. The sampler 100 may be used for other purposes as well, such as in any equipment in which liquid samples may be withdrawn with a probe. The probe 102 may be moved vertically up and down and, as discussed earlier, either the sample well plate 129 or the sampler 100 may be moved laterally so that the probe 102 may be inserted in the various wells shown in the sample well plate 129. To prevent contamination, when the probe 102 is moved from well to well, the probe 102 may be pulled into the wash station 104 and washed so that cells from one well do not contaminate cells of another well. Some samplers may move the probe to a wash station that is located adjacent to, or outside of, the area of the sample well plate. However, moving the probe all of the way to the side of the sample well plate each time a sample is taken through the probe in order to wash the probe may greatly increase the movement of the sampler and will therefore lengthen the process of taking samples, thereby delaying analysis. In the implementation illustrated in FIG. 4, however, the wash station 104 travels with the probe 102 and is located proximate to the sample well plate 129 to reduce the amount of movement of the probe needed in order to take each successive sample from the wells.

As illustrated in FIG. 4 and noted earlier, the sled 114 is coupled to the wash station 104. The sled 114 moves by gravity and normally rests on either the back portion of the probe holder assembly 106 in the first bottomed-out position or on the z-gauge assembly 122 in the second bottomed-out position (in FIGS. 1 and 4, however, the sled 114 is shown in neither bottomed-out position, which, as will be clear in later discussion, can be caused by a collision between the sled 114 and another object). The probe drive screw 112 may be rotated in order to move the probe holder assembly 106 up and down, which may also cause the sled 114 and the wash station 104 to move up and down when the sled is in the first bottomed-out position.

Figure 5:
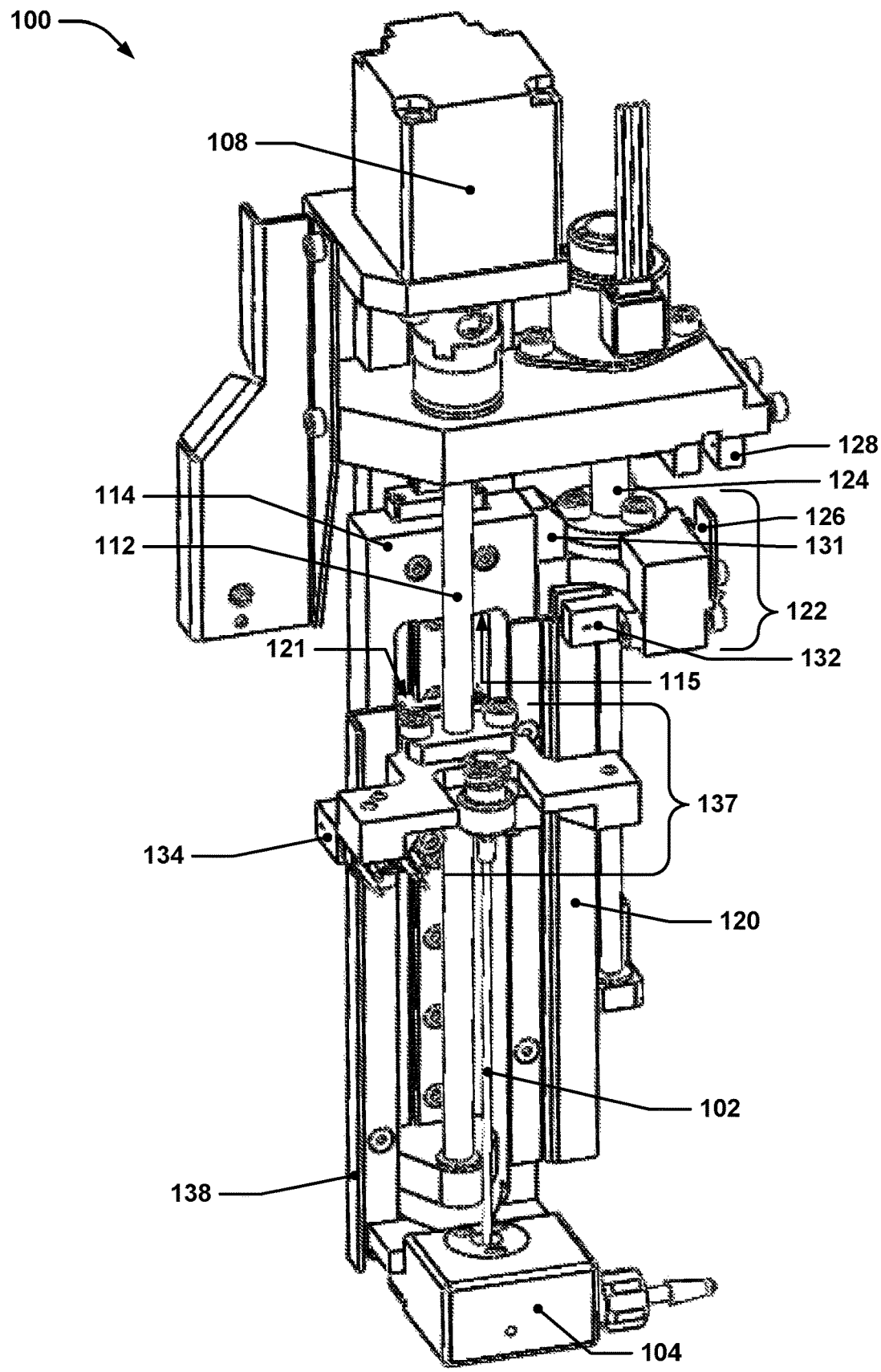
FIG. 5 is another view of the sampler of FIG. 1 with certain parts removed.

FIG. 5 is another view of the implementation of the sampler 100 of FIGS. 1 and 4. As illustrated in FIG. 5, the wash station 104 is connected to the sled 114 and moves vertically with the sled 114. The probe drive screw motor 108 may cause the probe drive screw 112 to rotate and move the probe holder carriage 137, which forms a portion of the probe holder assembly 106 (some components of the probe holder assembly 106 are not depicted in FIG. 5), in a vertical direction, either up or down. The probe holder carriage 137 may engage an arch 115 of the sled 114; when the arch 115 is contacting the probe holder carriage 137, the sled may be in the first bottomed-out position and the probe holder carriage 137/probe holder assembly 106 may carry the sled 114 either up or down. The z-gauge assembly 122 is set in a position that limits the extent to which the wash station 104 can move in a downward direction. In FIG. 5, the z-gauge assembly 122 has been set to a relatively high elevation, causing the sled 114 to engage with the z-gauge assembly 122 in the second bottomed-out position after only a small amount of movement downwards; the probe holder carriage 137, however, has continued to travel downwards and the sled 114 is therefore not in the first bottomed-out position.

Figure 15:
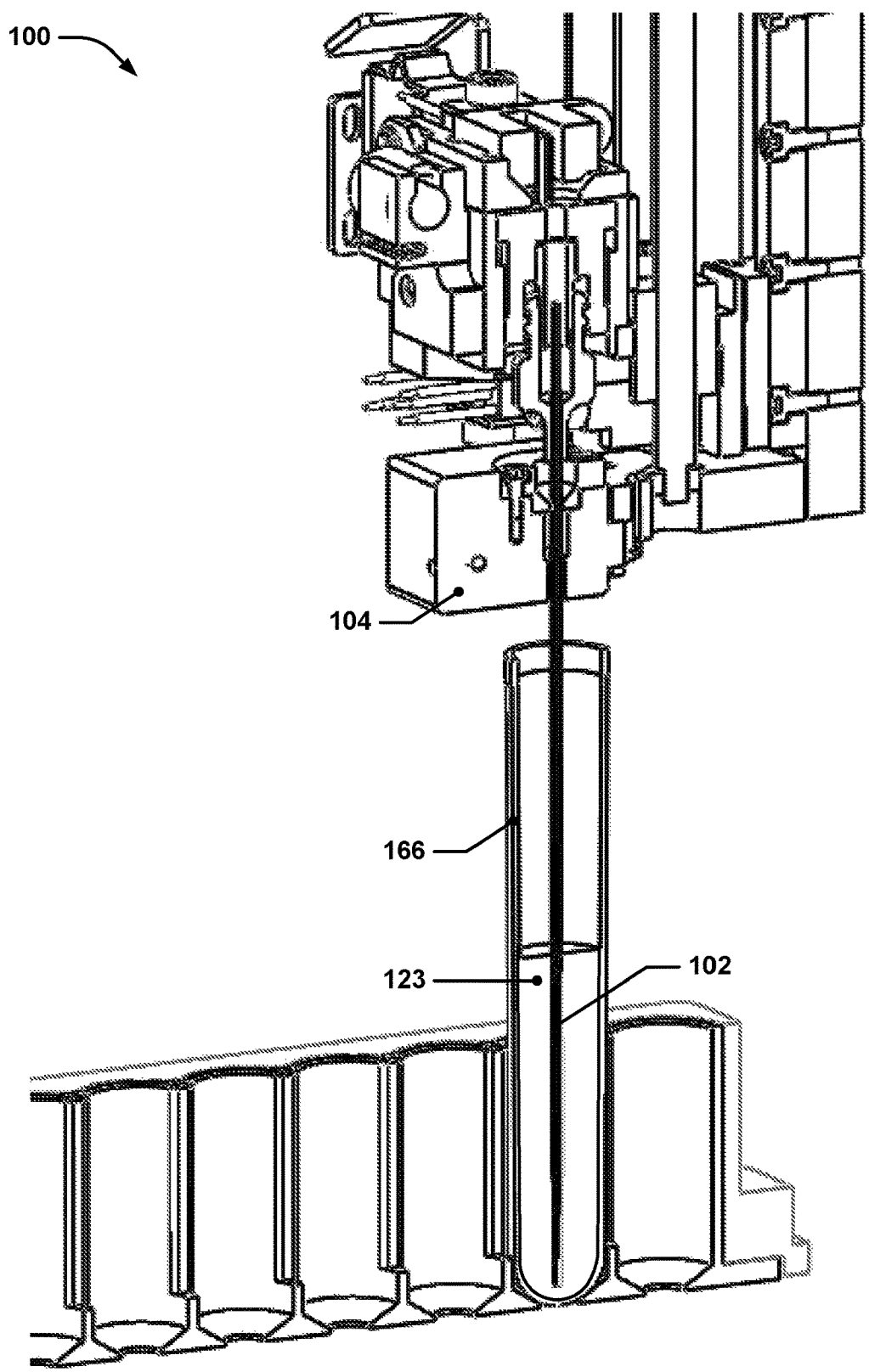
FIG. 15 is a view of a probe from the example sampler inserted in a sample tube.
Figure 16:
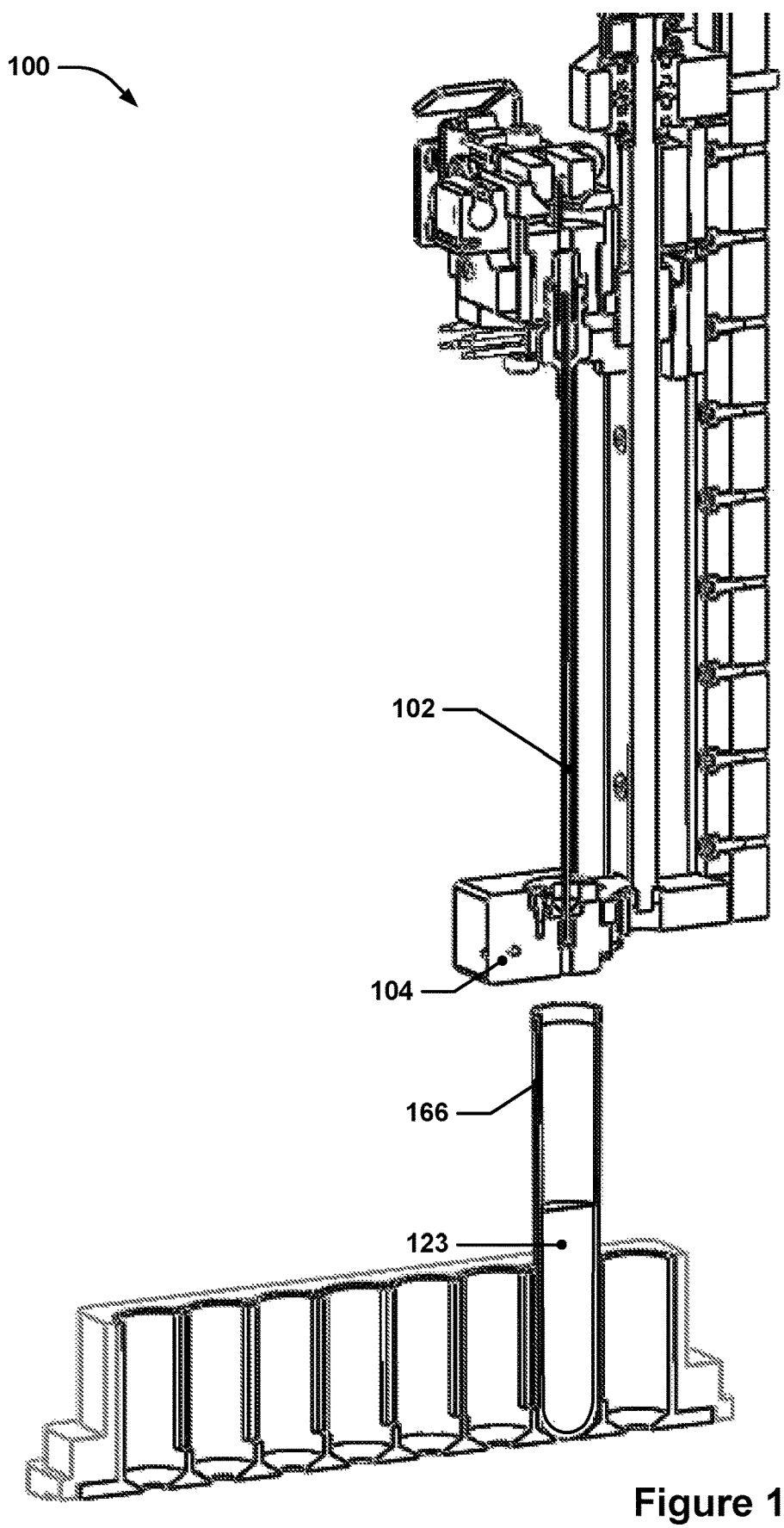
FIG. 16 is another view similar to FIG. 15, with the probe withdrawn from the sample tube and disposed in the wash station.

Sample well plates, such as sample well plate 129 (FIG. 4) can be different heights and the user may specify a height for the z-gauge assembly for a particular well plate such that the wash station is prevented from colliding with that well plate during sampling. In some implementations, sample tubes, such as sample tube 166 (FIGS. 15 and 16) may also extend from a holder and samples may be retrieved from the sample tubes instead of from a well plate. In such instances, the user may specify the height of the sample tube(s) to ensure that the wash station 104 does not collide with the sample tubes. The sample tubes, such as illustrated in FIGS. 15 and 16, may be standard 5 ml sample tubes and may have a specified height, although other height tubes may be used as well. In addition, the sample well plates, such as sample well plate 129, are available in standard well plate sizes that have specified heights. In order to accommodate the different potential z-gauge heights that may be needed in order to utilize different types of sample containers, the sampler 100 may be controlled by a controller (FIG. 17) having access to a database of preset heights for the z-gauge assembly for each of these standard well plates and sample tubes so that the user simply has to push one or more buttons or select information allowing the controller to determine what z-gauge assembly height to set the height of the wash station 104 that corresponds to the selected sample well plate or sample tubes. Such information may include, for example, actual heights of sample wells or sample tubes (when installed in a sample tube rack), model numbers of sample wells or sample tubes, standard size designations for sample wells or sample tubes, etc. Such information may be contained in a database that is accessible by the controller and may be queried, based on the user input, in order to determine the z-gauge height setting to use for the selected sample well plate or sample tube(s). The database may also include information specifying a probe holder assembly height that is to be used as the lower limit of travel for the probe holder assembly 106. Such probe holder assembly heights may be defined so as to cause the tip of the probe 102 to be a pre-set distance away from the bottoms of the sample tubes or sample wells, e.g., 2 mm to allow for collection of the sample without having the probe 102 collide with the bottom of the sample well or the sample tube. In some instances, however, the sampler may be configured to purposefully crash the probe into the bottom of a sample well or sample tube. For example, the probe may be crashed into the bottom of the sample tube or sample well and then withdrawn some distance, e.g., 1 mm or 2 mm, to place the probe tip near the bottom of the sample well or sample tube but without having the tip of the probe be blocked by the bottom of the well or tube. This may allow the probe to collect more of the sample within the sample well or tube than might otherwise be possible.

As noted earlier, in FIG. 5, the sled stop 131 of sled 114 is resting upon the z-gauge assembly 122 so that the sled 114 cannot move further downward from the depicted location. As such, the wash station 104 is at the lowest position permitted by the z-gauge assembly 122 in the depicted z-gauge assembly 1022 position. The probe holder carriage 137 can be driven upwards by rotating the probe drive screw 112 so that a rear lifting surface 121 of the probe holder carriage 137 can engage the arch 115 and lift the sled 114 and, consequently, the wash station 104 in a vertical direction. As the probe drive screw 112 is rotated and the probe holder carriage 137 is moved in a downward direction, the probe 102 is also moved down and may extend from the wash station 104 and into a sample well or sample tube to allow a sample to be taken from the sample well plate 129 (FIG. 4) or the sample tube 166 (FIG. 15). Again, the wash station 104 is stopped from moving any farther downwardly than the second bottomed-out position in order to prevent a collision with a sample well plate, such as sample well plate 129 (FIG. 4), or a sample tube, such as sample tube 166 (FIG. 15).

As further shown in FIG. 5, a z-gauge sensor 132 may be used to detect when the sled 114 is in the second bottomed-out position. In other words, the z-gauge sensor 132 detects when the sled stop 131 is resting on the z-gauge assembly 122 and may generate a z-gauge sensor signal 172 (FIG. 17) when such a condition exists. In this example sampler 100, optical beam sensors are used as the sensors that are discussed—such sensors may include a photoemitter, e.g., a light source, and a photodetector, e.g., a light detector. The photoemitter and the light source may be positioned across from one another such that the photoemitter directs light into the photodetector; this light may be projected across a gap that separates the photoemitter from the photodetector. Such a sensor may be mounted to one component, and a corresponding "flag" may be mounted to another component that may move relative to the first component. The flag may be mounted so that it blocks light from the photoemitter from reaching the photodetector when the two components are in some positions and does not block the light from the photoemitter from reaching the photodetector when the two components are in one or more other positions. While optical beam sensors such as those described are attractive since they require no contact and thus suffer no mechanical wear-and-tear (thus reducing the chance of sensor failure, the chance of particulate generation, and noise), other sensors may be used to similar effect, e.g., linear variable differential transformers (LVDTs), contact switches, ultrasonic sensors, etc., and it is to be understood that the principles and concepts discussed herein may be implemented using such other sensors. It is also to be understood that there may be flexibility as to where the sensors themselves are mounted—for example, a sensor that is configured to detect whether one component is in a particular position relative to another component may, in many cases, be mounted on either component (practically speaking).

For example, a z-gauge flag 120 may be attached to the sled 114 and may cause the z-gauge sensor 132 to produce the z-gauge sensor signal 172 when the sled stop 131 is resting on the z-gauge assembly 122, i.e., when the sled is in the second bottomed-out position, since the z-gauge flag 120 just clears the z-gauge sensor 132 when the sled stop 131 is resting on the z-gauge assembly 122, e.g., the z-gauge flag blocks the light beam in the z-gauge sensor 132 during the full range of relative motion between the z-gauge assembly 122 and the sled 114 except for a very small window bracketing the second bottomed-out position (in the ideal case, this window would be infinitely thin, but from a practical standpoint, the window may span a few thousandths of an inch to a millimeter or so to allow for tolerances and manufacturing variation). Thus, when the sled 114 is in the second bottomed-out position relative to the z-gauge assembly 122, the z-gauge flag would not block the light beam in the z-gauge sensor, causing a z-gauge sensor signal 172 to be generated. When the sled 114 moves in an upward direction relative to the z-gauge assembly 122 as a result of the engagement of the rear portion of the probe holder carriage 137 with the arch 115 of the sled 114, the z-gauge sensor 132 may be blocked by the z-gauge flag 120 and the z-gauge sensor signal 172 may be turned off (or may otherwise change state), indicating that the sled 114 is no longer in its lowest position for that z-gauge assembly height setting, i.e., the second bottomed-out position.

FIG. 5 also illustrates a probe holder sensor 134, e.g., an optical beam sensor similar to those discussed earlier, that detects when the sled 114 is in the first bottomed-out position relative to the probe holder assembly 106, e.g., when the rear lifting surface 121 of the probe holder carriage 137 has engaged the arch 115 of the sled 114. A probe holder flag 138 may be attached to the sled 114 and may be configured to cause the probe holder sensor 134 to generate a probe holder sensor signal 174 (FIG. 17) just as the rear lifting surface 121 of the probe holder carriage 137 engages the arch 115 of the sled 114, e.g., just as the sled 114 enters the first bottomed-out position. For example, the probe holder sensor 134 may generate the probe holder sensor signal 174 when the probe holder carriage 137 has been moved upwards by an amount sufficient for the probe holder sensor 128 to clear the probe holder flag 138, which is generally the same point at which the rear lifting surface 121 of the probe holder carriage 137 engages the arch 115 and causes the sled 114 to be in the first bottomed-out position.

Consequently, when there is no signal from the z-gauge sensor 132 and there is no signal from the probe holder sensor 134, the wash station 104 has most likely collided with something, such as a sample well plate or sample tube, since the sled 114 is not resting on the z-gauge assembly 122 and is not being carried by the probe holder carriage 137. This is explained in more detail below.

Also visible in FIG. 5 is the z-gauge home sensor 128, discussed earlier herein, that may detect when the z-gauge assembly 122 is in a pre-set home position relative to the base assembly 145. The z-gauge home flag 138 may, when the z-gauge assembly 122 travels to the home position, be inserted into the opening in the z-gauge home sensor 128 and block the light beam in the z-gauge home sensor 128. Accordingly, when the z-gauge home sensor 128 is not producing a signal, the z-gauge assembly 122 may be considered to be in an upward and home position (in systems with optical home sensors, the home position may be some small distance beyond the point where the z-gauge home sensor registers a chance in the presence or absence of the z-gauge assembly in order to prevent situations in which the z-gauge home sensor that is used be "on the edge," i.e., in a state in which the home sensor may change states due to minor fluctuations in the environment, e.g., light fluctuations. In the depicted implementation, the z-gauge drive screw motor 116 (and the probe drive screw motor 108) may be a stepper motor that is configured to move the z-gauge assembly from the home position to a desired elevation by rotating the z-gauge drive screw a specified number of revolutions. If the apparatus is powered off during use, however, it may be necessary to move the z-gauge assembly 122 back into the home position before setting the height of the z-gauge assembly once the unit is powered back on—otherwise, the z-gauge assembly may be moved too far and, in some cases, may bottom out on the base assembly. In some implementations, however, the position of the z-gauge assembly 122 may be precisely known, e.g., if a continuous range position sensor such as an LVDT is used to monitor the height of the z-gauge assembly 122. In such instances, the z-gauge assembly may be moved from whatever position it is in (without needing to be returned to a home position) when the device is powered up to whatever height is desired simply by checking the output from the sensor during repositioning of the z-gauge assembly 122. In some implementations, the z-gauge home sensor may be omitted entirely, e.g., a mechanical clutch may be implemented in the drive mechanism that moves the z-gauge assembly 122 so that the z-gauge assembly, when it bottoms out against the base assembly 145, may stop in the home position without causing undue stress or damage to the drive mechanism—in such implementations, the actuator that moves the z-gauge assembly 122 may be actuated long enough that the z-gauge assembly 122 is assured to be in the home position regardless of its starting position. For example, torque-limited stepper motors may be used to drive the z-gauge assembly 122 and the probe holder assembly 106 up and down; if one of the driven assemblies collides with a fixed object, then the driving motor may continue rotating even though the drive assemblies has stopped. In some implementations, torque-limited stepper motors may be used to provide homing capabilities without the use of a home sensor, e.g., the stepper motor may be activated for a sufficiently long period of time to cause the driven assembly to reach the home position—when the driven assembly reaches the home position, it will stop and the driving motor will continue to rotate without further translation of the drive assembly.

Figure 6:
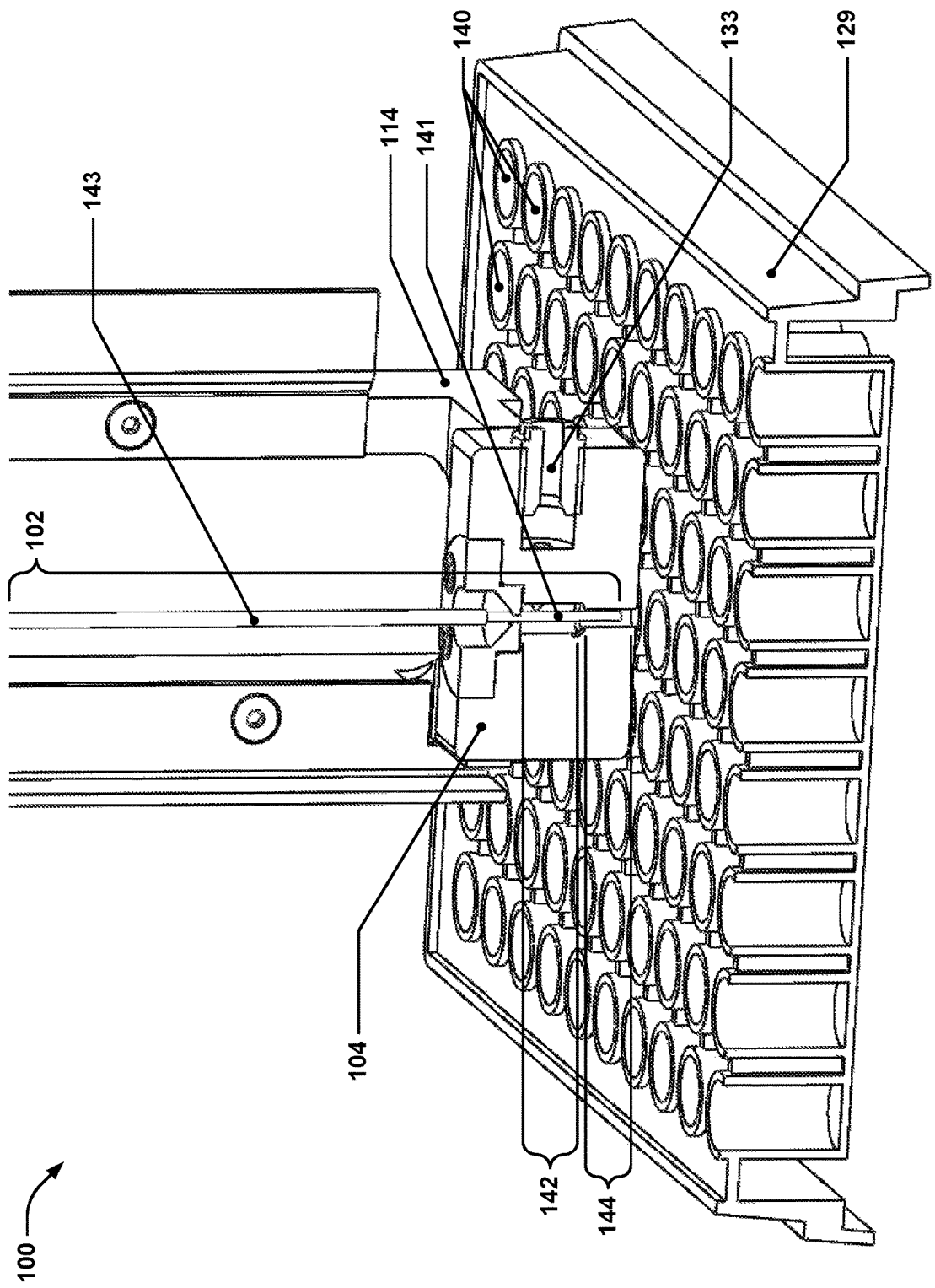
FIG. 6 is a cutaway view of a portion of the sampler of FIG. 1 and a sample well plate.

FIG. 6 is a sectional view of portions of the sampler 100 and the sample well plate 129. As illustrated in FIG. 6, the wash station 104 is shown in a sectional view. The sectional view of the wash station 104 illustrates a sample line 141 disposed in the wash chamber 142 of the wash station 104. The sample line 141, together with a probe tube 143, may form the probe 102. The sample line 141 may extend into a probe opening 144, as illustrated in FIG. 6. During washing, the sample line 141 may be pulled all the way into a wash chamber 142 while wash fluid is circulated within the wash chamber 142 so that all of the portions of the sample line 141 that were immersed in the sample fluid in the sample wells are washed between samples. The wash station 104 may operate by injecting wash fluid into the wash chamber 142, which then swirls around the sample line 141 and may be drawn out of the wash station via wash fluid exit nozzle 130 (not visible in this view, although wash fluid inlet 133 is shown). FIG. 6 also illustrates the sample wells 140 in the sample well plate 129. In some implementations, a controller may control valves or pumps to start and stop wash fluid flow within the wash station in coordination with the extension/retraction of the probe 102. In other implementations, however, the wash fluid may be flowed through the wash chamber 142 continuously. In some additional or alternative implementations of either type of wash fluid delivery, a controller may control valving that causes wash fluid to also flow down the sample line 141 so that it backwashes the probe 102 and causes any leftover sample material in the sample line 141 to flow into the wash chamber 142 to be carried away via the wash fluid exit nozzle 130. In some implementations, the wash fluid introduced into the wash chamber 142 may also be sucked into the probe 102 and either expelled back into the wash chamber 142 or removed upstream.

Figure 7:
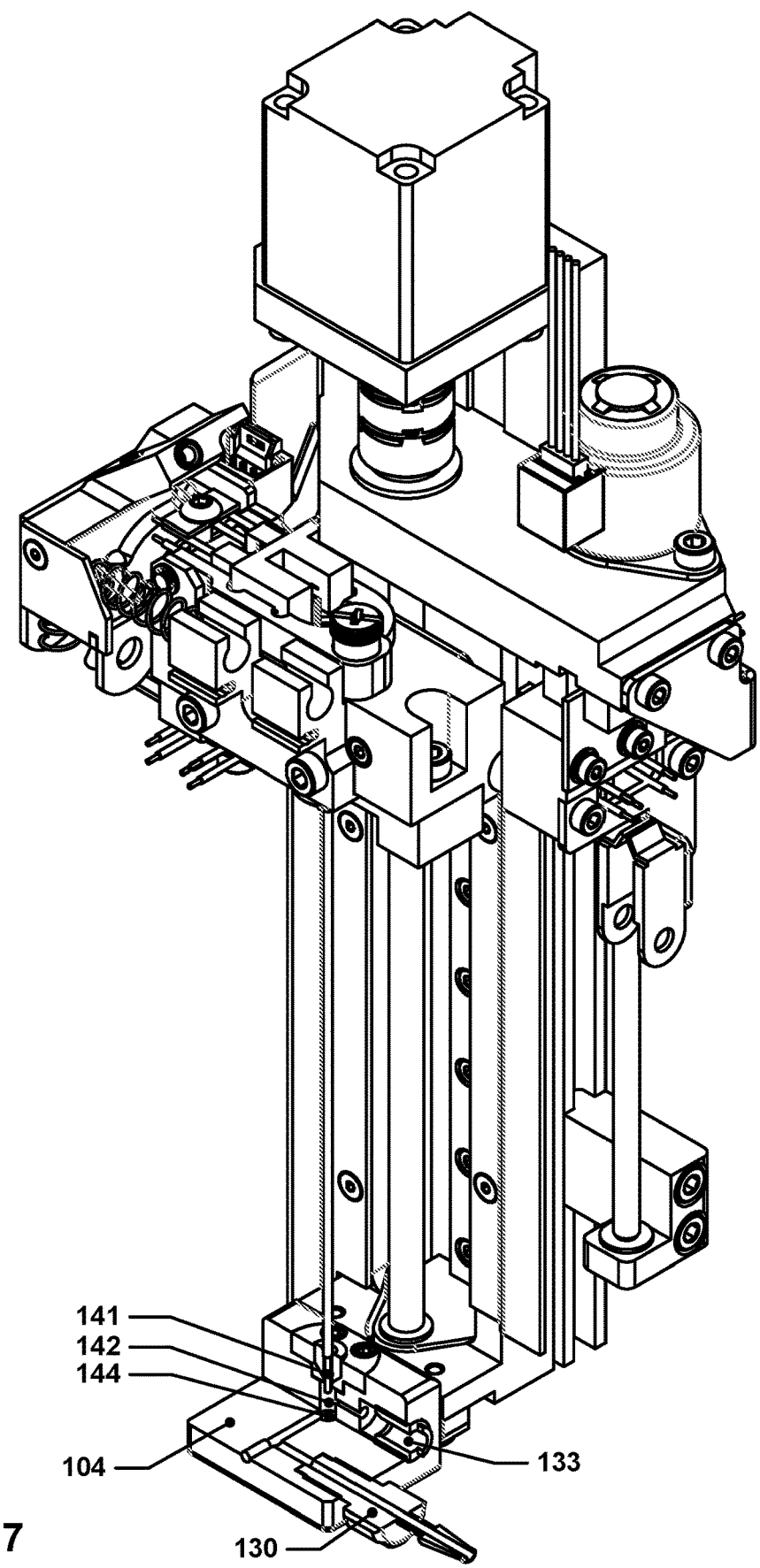
FIG. 7 is an isometric cut-away view of the example sampler of FIG. 2.

FIG. 7 is an isometric cut-away view of the example sampler of FIG. 2. As can be seen, a wash fluid inlet 133 provides fluid inlet passage that has a centerline that is slightly offset from the centerline of a wash chamber 142 in the wash station 104 (although the fluid inlet passage may, in some implementations, be centered on the wash chamber 142 centerline. Wash fluid that is introduced into the wash chamber 142 through the wash fluid inlet 133 will thus swirl around the interior surface of the wash chamber 142 before flowing downwards to the fluid passage that draws the wash fluid out of the wash chamber 142 and through the wash fluid exit nozzle 130. The wash chamber 142 and the probe opening 144 may, together, form a passage through which the probe 102 may pass as the probe 102 is extended from and retracted into the wash station 104. The wash station may also have an opening on the top side of the wash chamber 142 that is sized smaller than the probe opening 144 to keep the flow of wash fluid from flowing upwards out of the wash station.

Figure 8:
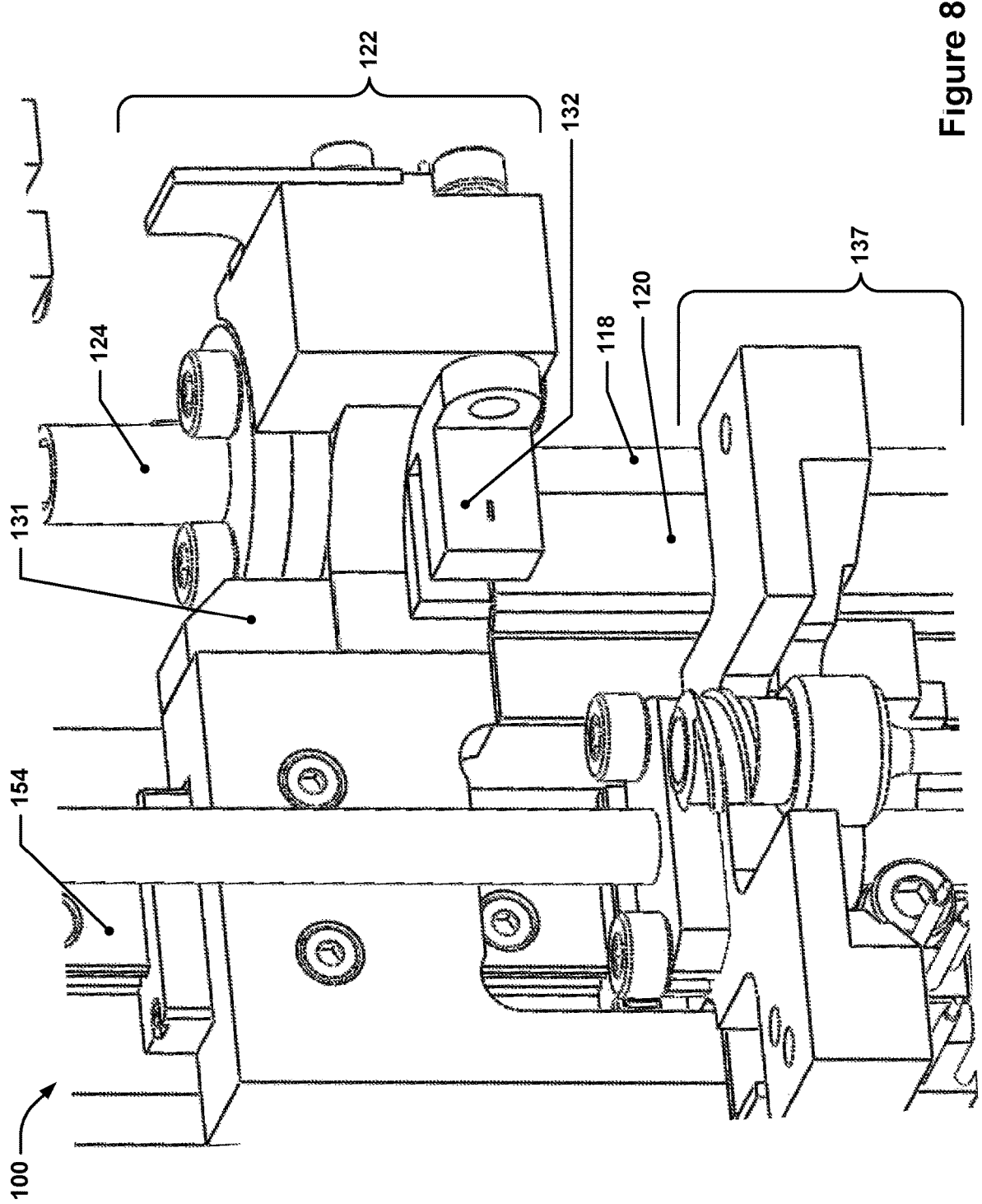
FIG. 8 is a partial view of a portion of the sampler of FIG. 1.

FIG. 8 is another view of a portion of the sampler 100 of FIG. 1. As shown in FIG. 8, the z-gauge assembly 122 is illustrated. Attached to the z-gauge assembly 122 is a z-gauge drive nut 124 that drives the z-gauge assembly 122 up and down relative to the base assembly 145 upon rotation of the z-gauge drive screw 118. Also visible is the sled stop 131, which is attached to the sled 114. As discussed earlier, the sled stop 131, due to the force of gravity, engages with and rests upon the z-gauge assembly 122 if not otherwise prevented from doing so, e.g., by virtue of being supported by the probe holder assembly 106 or by virtue of colliding with an external object. The z-gauge flag 120 that is attached to the sled 114 is also visible in FIG. 8. As the sled 114 moves up and down, so does the z-gauge flag 120. The z-gauge sensor 132 senses when the sled 114 and the sled stop 131 are not resting upon the z-gauge assembly 122 because the z-gauge flag 120 blocks the light beam in the z-gauge sensor 132 in such cases. In other words, if the sled 114 moves upwardly so that the sled stop 131 is not resting against the z-gauge assembly 122, the z-gauge sensor 132 will be blocked by the z-gauge flag 120, thereby indicating that the sled 114 has moved upwardly with respect to the z-gauge assembly 122. The blocking of the z-gauge sensor 132 by the z-gauge flag 120 may, in some circumstances, indicate that the wash station has crashed into a sample well plate 129 (FIG. 4) or a sample tube 166 (FIG. 15), as explained in more detail herein. The blocking of the z-gauge sensor 132 by the z-gauge flag 120 may also alternatively indicate that the sled 114 has been lifted by the probe holder carriage 137, e.g., by the rear lifting surface 121 of the probe holder carriage 137 engaging the arch 115 of the sled 114.

Figure 9:
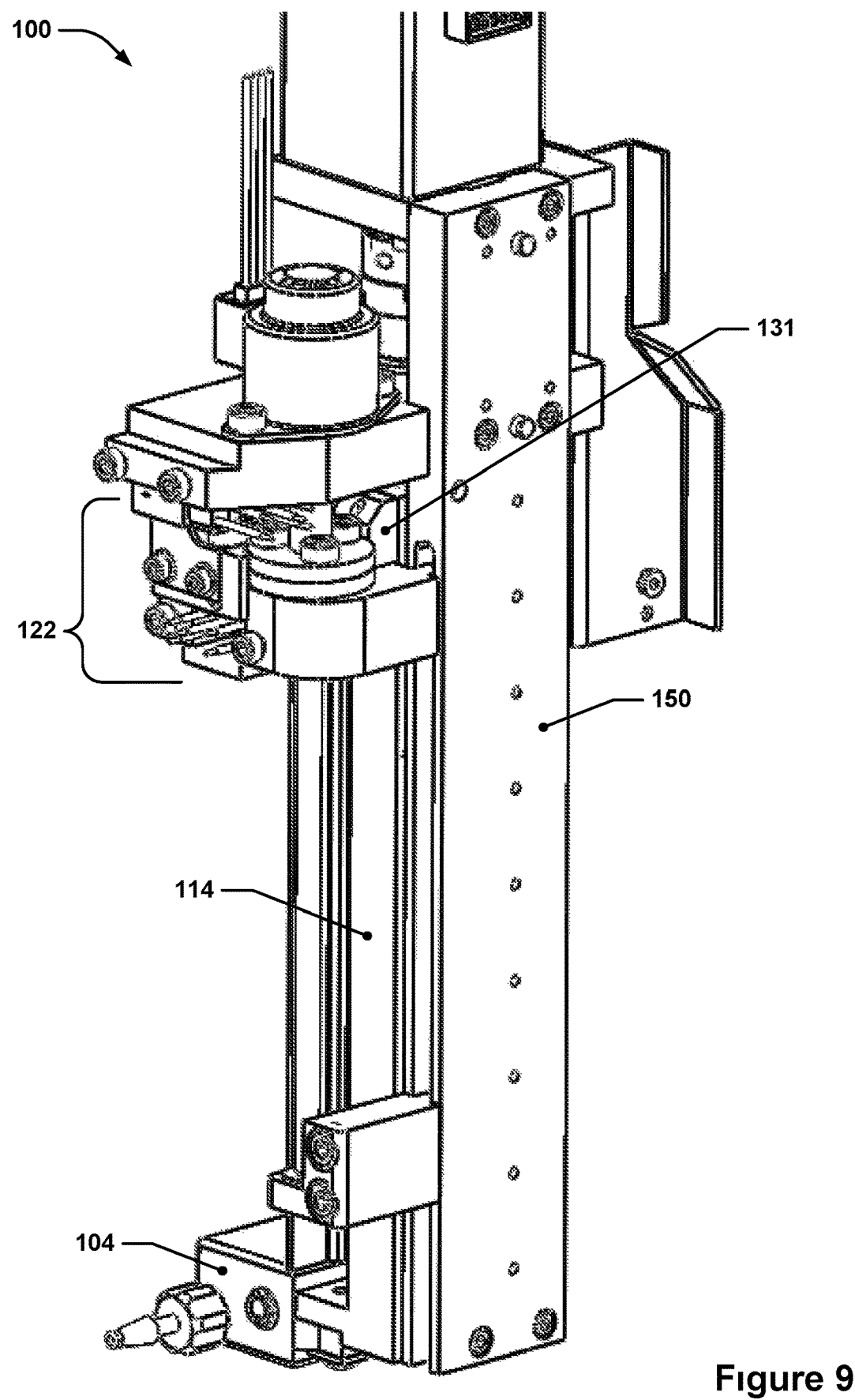
FIG. 9 is a rear view of portions of the example sampler of FIG. 1.

FIG. 9 is a rear view of portions of the sampler 100 of FIG. 1. As illustrated in FIG. 9, the sled stop 131 rests upon the z-gauge assembly 122 in the depicted z-gauge assembly positioning, and the sled 114 may be connected to the wash station 104 and support the wash station 104 such that movement of the sled 114 in a vertical direction also moves the wash station 104.

Figure 10:
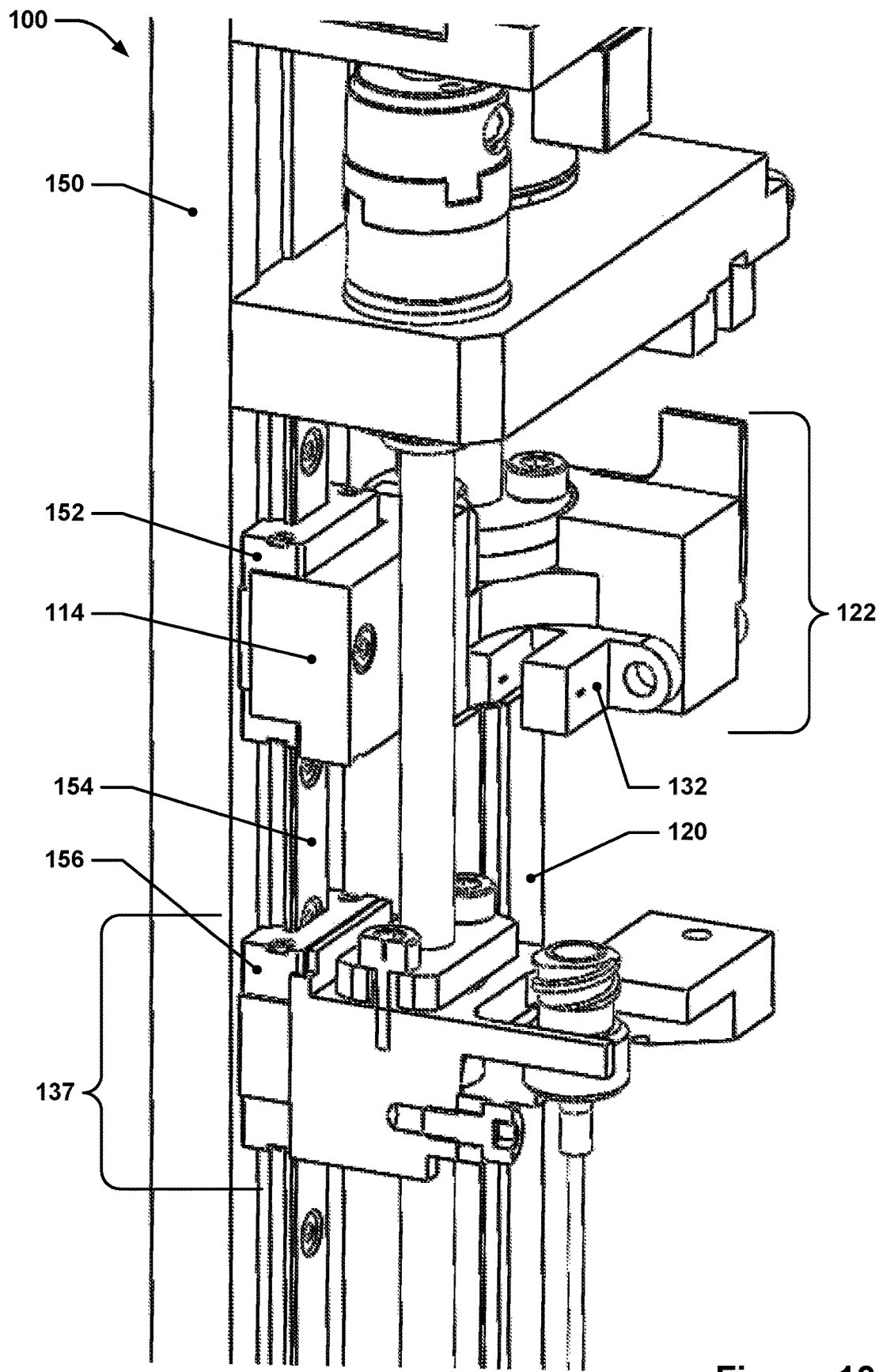
FIG. 10 is a sectional view of a portion of the example sampler of FIG. 1.

FIG. 10 is a left side sectional view of portions of the sampler 100 of FIG. 1. As illustrated in FIG. 10, the base plate 150 supports the linear guide rail 154 that is attached to the base plate 150. The upper slide 152 may be engaged with the linear guide rail 154 and may move freely in a vertical direction on the linear guide rail 154. The sled 114 may be attached to the upper slide 152, which allows the sled 114 to also move vertically on the linear guide rail 154. As discussed earlier, the weight of the sled 114 causes the sled to move downwardly unless in either the first bottomed-out position, the second-bottomed out position, or unless otherwise prevented from moving downwards by another object, i.e., a crash situation. A lower slide 156 also engages the linear guide rail 154 and moves freely on the linear guide rail 154. The probe holder carriage 137 may be attached to the lower slide 156 so that the probe holder carriage 137 moves vertically along the linear guide rail 154. In some implementations, the sled 114 may include an elongate slot 157, such as is depicted in FIG. 2, the top of which may provide, for example, the arch 115. The lower slide 156 (or a portion of the probe holder carriage 137) may pass through the elongate slot before interfacing with the linear guide rail 154. FIG. 10 also depicts the z-gauge sensor 132 and z-gauge flag 120 that indicate whenever the sled 114 is not sitting upon the z-gauge assembly 122, i.e., not in the second bottomed-out position.

Figure 11:
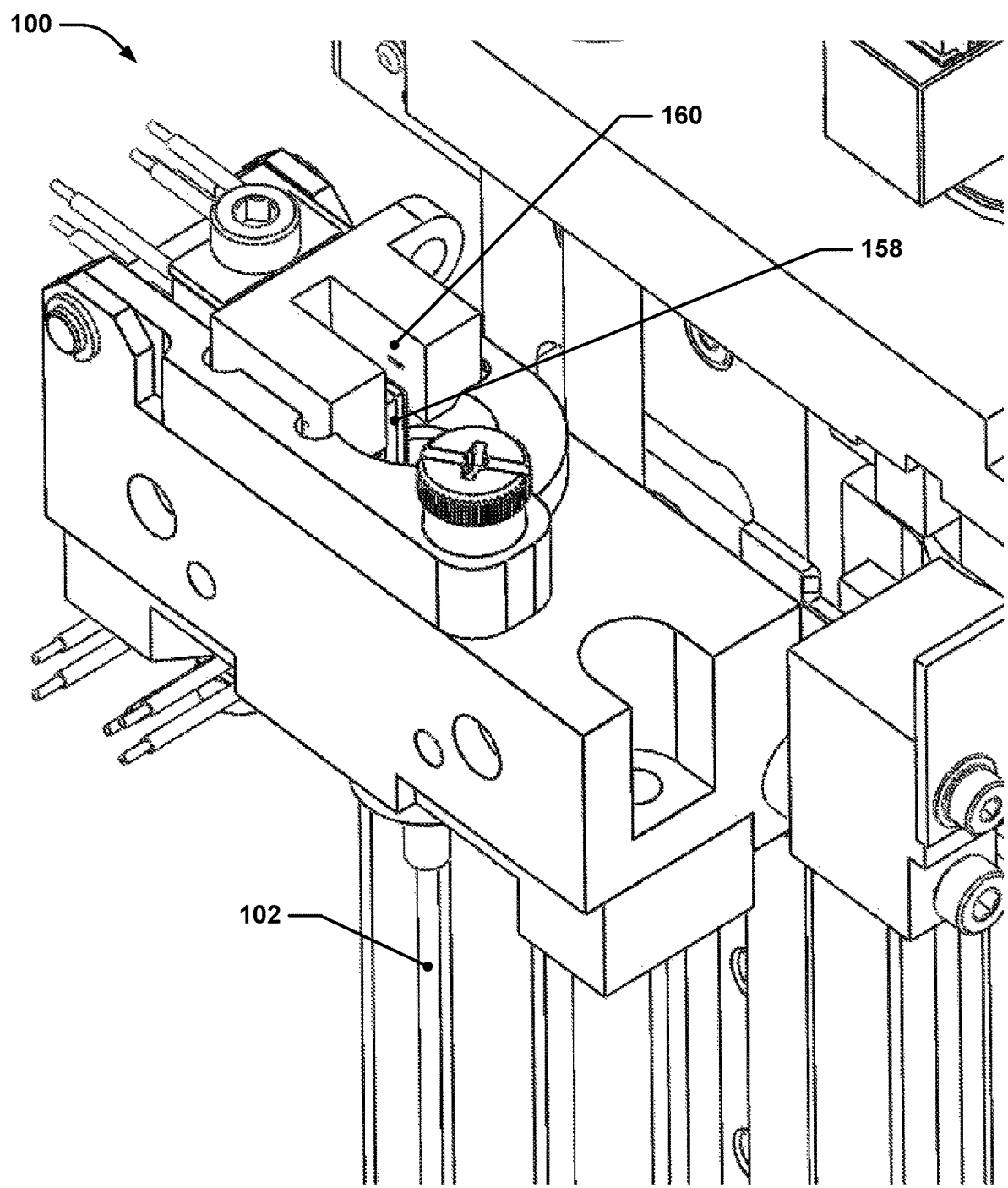
FIG. 11 is another view of a portion of the embodiment of the sampler of FIG. 1.

FIG. 11 is another partial view of the sampler 100 of FIG. 1. FIG. 11 depicts the probe 102 and a probe crash flag 158 that is connected to the probe 102. In some implementations, the probe crash flag 158 may be connected with a probe adapter (not shown), which may be a component that interfaces with the probe 102 and also provides the probe crash flag 158 (thereby allowing the probe to be simpler in design). The probe 102 has a slight vertical play, so that if the end of the probe 102 that is inserted into the sample wells collides with a surface, the probe 102 will move upwardly relative to the probe holder assembly 106 by a very slight amount. For example, the probe 102 may move upwardly about 2 mm. The probe crash flag 158, as indicated above, is connected to the probe. The slight movement of the probe in an upward direction may cause the probe crash flag 158 to move upwardly and, for example, block a light beam in a probe crash sensor 160 and cause a probe clear signal generated by probe crash sensor 160 to turn off or otherwise change state. A lack of a probe clear signal from the probe crash sensor 160 may, for example, indicates that the probe has crashed into a surface, thereby causing the probe crash flag 158 to rise up and block the light beam in the probe crash sensor 160. A controller, described below with respect to FIG. 17, may then retract the probe responsive to such a signal.

Figure 12:
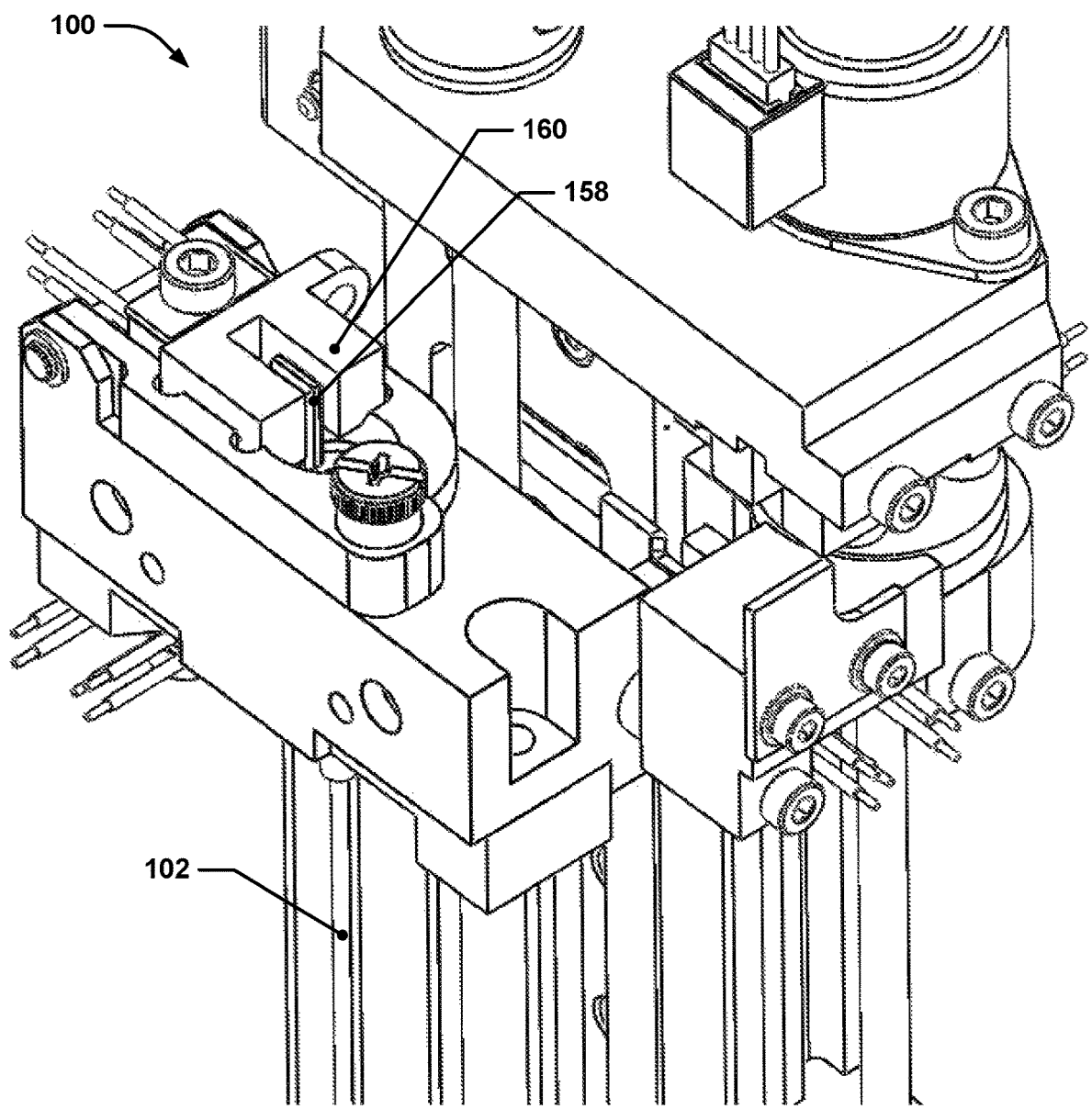
FIG. 12 is an additional view of a portion of the example sampler of FIG. 1.

FIG. 12 illustrates the probe crash flag 158 in the up position blocking the probe crash sensor 160. This is an indication that the probe 102 has collided with a surface, such as the bottom of a well or a sample tube, in an undesirable manner.

Figure 13:
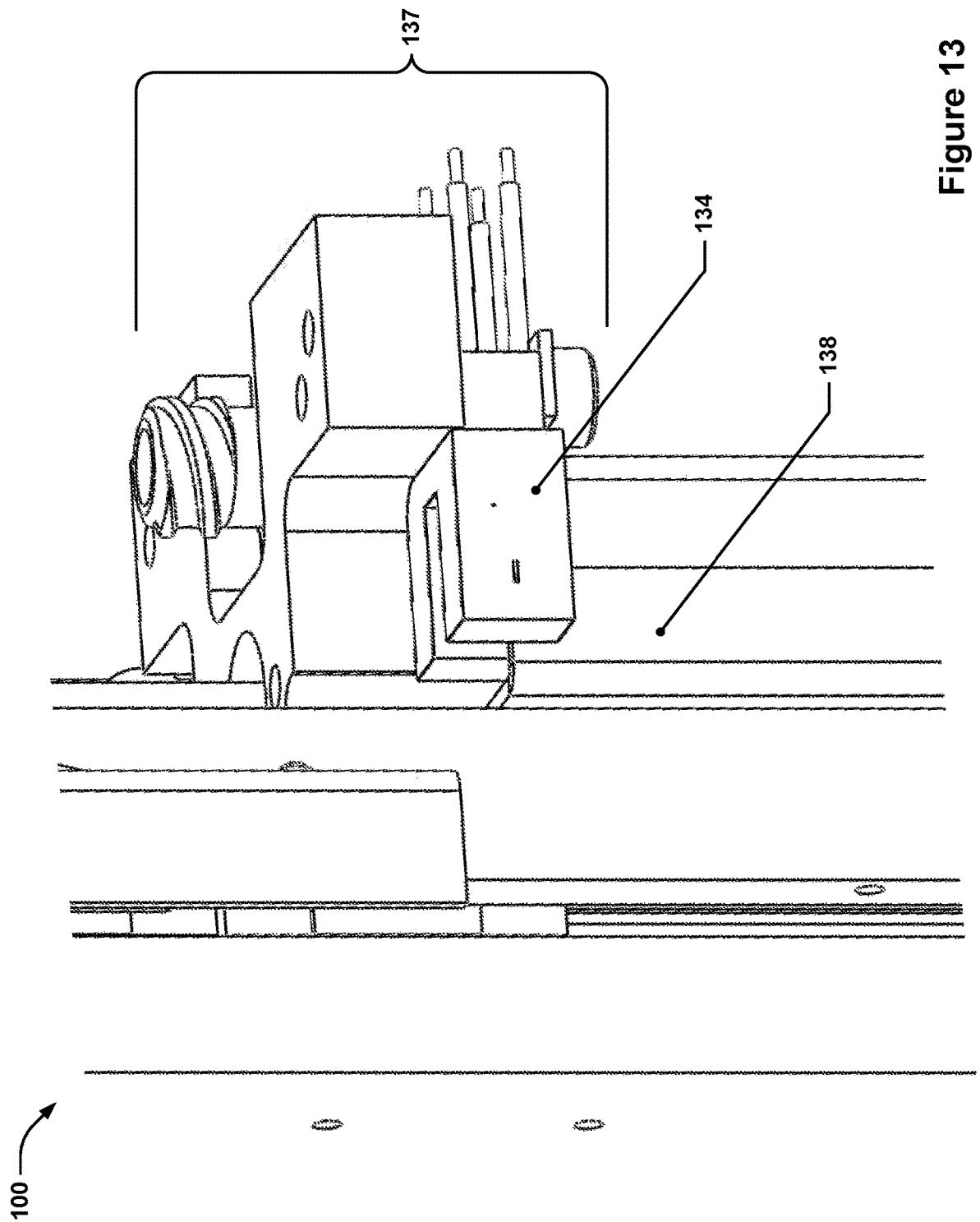
FIG. 13 is another view of a portion of the example sampler of FIG. 1.

FIG. 13 is a view of a portion of the sampler 100, illustrated in FIG. 1. FIG. 13 illustrates the probe holder sensor 134 which may interact with probe holder flag 138. The probe holder flag 138 may be attached to the sled 114, while the probe holder sensor 134 may be attached to the probe holder carriage 137. When the probe holder carriage 137 is moved upwardly and engages the sled 114, thereby placing the sled in the first bottomed-out position, a light beam in the probe holder sensor 134 may not be blocked by the probe holder flag 138 and may generate a probe holder sensor signal indicating that the sled 114 and the wash station 104 are being carried by the probe holder carriage 137.

Figure 14:
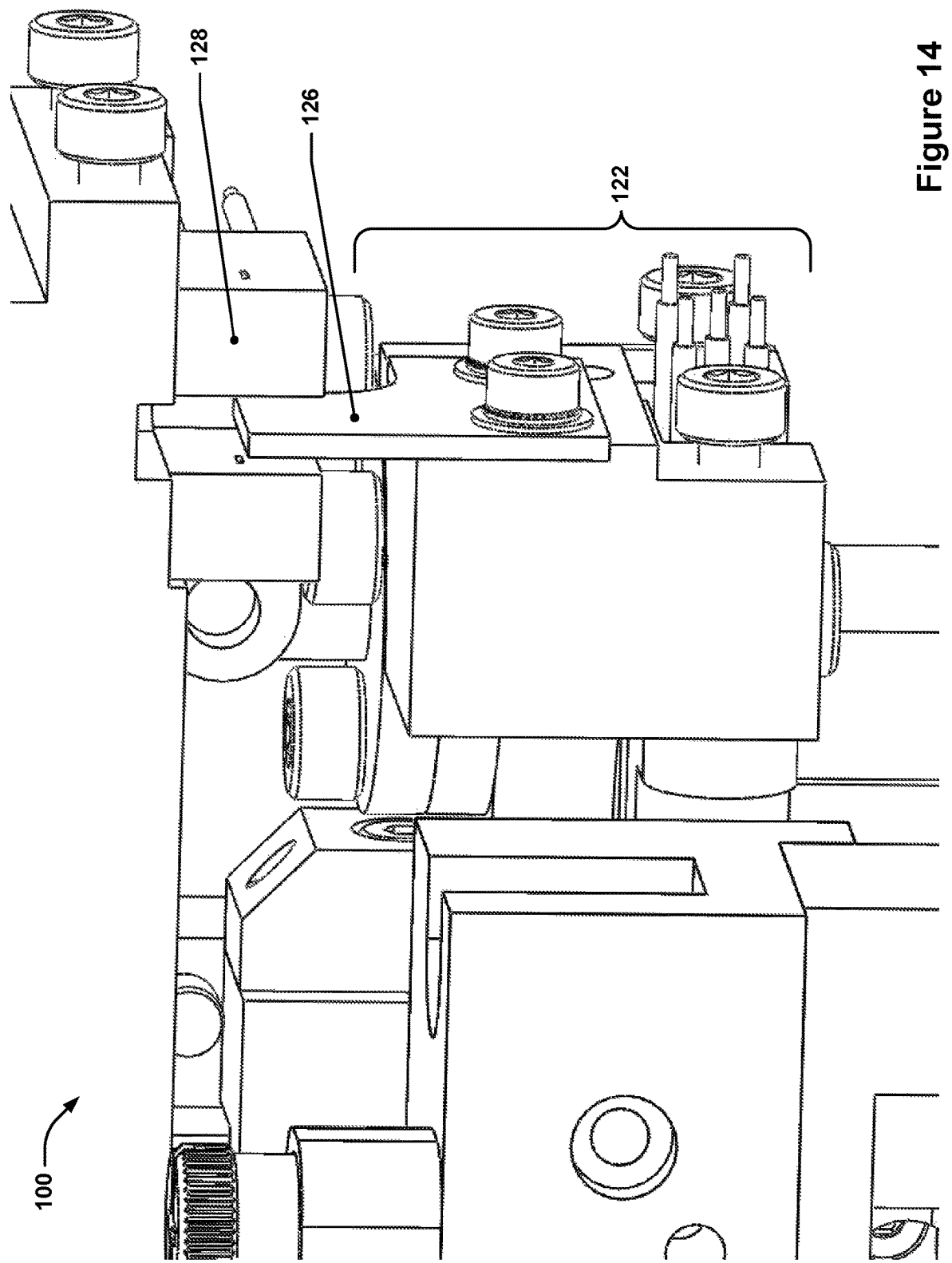
FIG. 14 is another view of a portion of the example sampler of FIG. 1.

FIG. 14 is a partial view of the sampler 100 of FIG. 1. As shown in FIG. 14, the z-gauge home flag 126 may be connected to the z-gauge assembly 122. The z-gauge home sensor 128 may be blocked by the z-gauge home flag 126 when the z-gauge assembly 122 is moved all the way up to its highest position, indicating that the z-gauge assembly is in its home position. In this manner, upon start-up, the position of the z-gauge assembly can be determined or re-set as needed.

FIG. 15 is a sectional view of the sampler 100 of FIG. 1, illustrating the removal of a sample 123 from a sample tube 166. Sample tube 166 may be a standard 5 ml sample tube. The probe 102 is shown in a downward position, so that a sample 123 is obtained from the lower portion of the sample tube 166. FIG. 15 also illustrates the wash station 104 that washes the probe 102 after obtaining the sample from the sample tube 166.

FIG. 16 is a view similar to the sectional view of FIG. 15 with the probe 102 in a fully upward position. The probe 102 is pulled upwardly by the probe holder assembly 106. The wash station 104 remains in a downward position just above the sample tube 166, so that the wash station 104 can wash the probe 102 as it is pulled from the sample of the sample tube 166. The length of the arms of the sled may be sufficiently long enough to allow the wash station 104 to remain in the lower position, as illustrated in FIG. 16, while the probe 102 is fully removed from the sample tube 166 and is pulled upwardly fully through the wash station 104, so that the entire immersed length of the probe, including the bottom of the probe 102, can be washed in the wash station 104.

Figure 17:
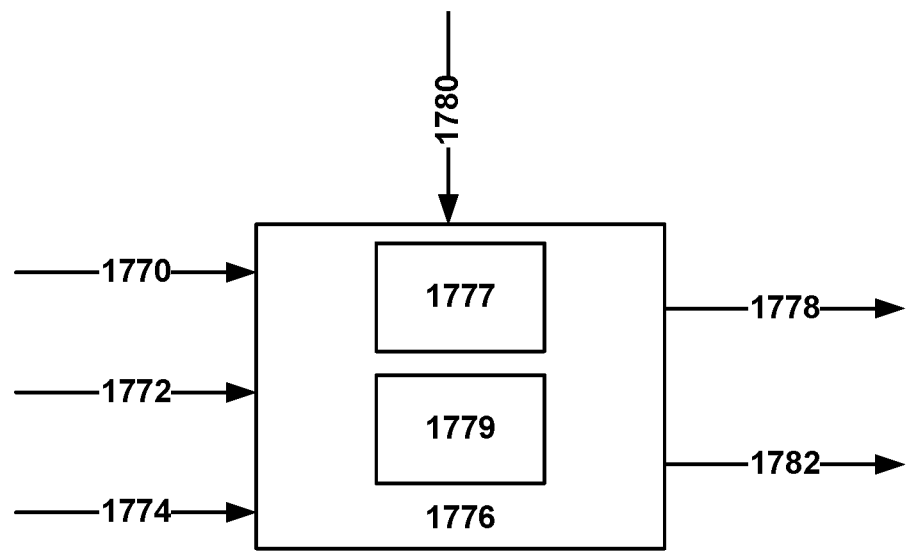
FIG. 17 is a view of an example controller that can be used with the example sampler of FIG. 1.

FIG. 17 is a schematic block diagram of a controller 176. As illustrated in FIG. 17, signals from the various sensors are applied to the controller 176, which may include a memory 1777 and one or more processors 1779 that are operatively connected with the memory. The memory 1777 may store computer-executable instructions for controlling the sampler to perform the various functions discussed herein. For example, the probe clear signal 170, the z-gauge sensor signal 172, and the probe holder sensor signal 174 may all be applied to the controller 176. In addition, a user input signal 180 may also be applied to the controller 176 to allow for user selection of various settings governing z-gauge assembly height and probe holder assembly height. The controller 176 may monitor these signals and generate a probe drive control signal 178 and a z-gauge control signal 182 in response to the presence of the input signals. For example, a z-gauge control signal may be generated to cause the z-gauge assembly 122 to move to a height that is set such that the wash station 104 will theoretically not collide with the sample tubes or sample well that may be below the sampler 100. Similarly, a probe drive control signal 178 may be generated that then causes the probe 102 to descend into the sample tube or sample well to an appropriate depth to allow a sample to be obtained using the probe 102.

During operation of the sampler 100, if the controller detects that the sled is neither in the first bottomed-out position relative to the probe holder assembly 106 nor the second bottomed-out position relative to the z-gauge assembly 122, then the controller may determine that something else other than the probe holder assembly 106 or the z-gauge assembly 122 is blocking downward movement of the sled 114, i.e., that the sled 114 or the wash station 104 may have crashed into something. In such cases, the controller may cause the z-gauge drive screw motor to drive the z-gauge assembly 122 upwards until the z-gauge sensor 132 indicates that the sled 114 is in the second bottomed-out position (and may cause the z-gauge drive screw motor to drive the z-gauge assembly 122 upwards a further distance to provide additional clearance between the wash station 104 or the sled 114 and the object causing the crash condition).

Similarly, if the probe clear signal 170 is not present or otherwise indicates that the probe 102 has crashed, the controller 176 may generate a probe drive control signal 178 that immediately stops and retracts the probe 102 by moving the probe holder assembly 106 upwards.

If a crash of the wash station 104 or the probe 102 is detected, then the controller may also generate an error signal indicating that this is the case in additional to causing the corresponding drive system to move the wash station or the probe upwards. Of course, if the probe is deliberately crashed, as discussed earlier, in order to determine where the bottom of the sample tube or sample well is located, then this may cause the error condition to be interpreted differently, i.e., not as an error.

In the depicted embodiment, the various sensors used are "fail-safe" sensors. For example, one could certainly implement the techniques discussed herein using oppositely configured sensors, e.g., use optical sensors for the z-gauge sensor 132 and the probe holder sensor 134 where a light beam is blocked (instead of being unblocked) when the sled is in the first bottomed-out position or the second bottomed-out position, respectively, but this would perhaps render the system vulnerable to sensor failures. For example, if an optical sensor failed and indicated a "blocked" state due to the light beam being occluded by dirt, or by the light source failing, or by the photodetector failing, this could lead the controller to falsely conclude that the sled was in one of the bottomed-out positions when it was actually in a crash state. Thus, while the use of fail-safe sensor arrangements such as those discussed above may offer advantages, other implementations in which such fail-safe arrangements are not used are also considered to be within the scope of this disclosure. In a fail-safe arrangement, the system may falsely conclude that a crash has occurred and take corrective action (which will not damage equipment), but in other arrangements without such fail-safe arrangements, the system may falsely conclude that no crash has occurred and thus fail to prevent damage to the hardware caused by continued operation in the crashed state.

FIGS. 18 through 25 depict schematic views of various states of operation of a sampler similar to the one discussed above with respect to FIG. 18.

FIG. 18 is a schematic view of an example sampler in a home position. As can be seen, a z-gauge assembly 1822 has been placed in a "home" position (the z-gauge home sensor discussed earlier is not shown in this schematic, but a similar sensor may be used to facilitate "homing" of the z-gauge sensor, if desired), which causes a sled 1814 to enter a second bottomed-out position relative to the z-gauge assembly. A probe holder assembly 1806 may also be driven upwards until it is also in a "home position," e.g., such as when the z-gauge assembly 1822 is in the home position and a z-gauge sensor 1832 and a probe holder sensor 1834 simultaneously indicate that the sled 1814 is in the first bottomed-out position and the second bottomed out position, e.g., when the probe holder sensor 1834 is not blocked by a probe holder flag 1838 and the z-gauge sensor 1832 is not blocked by a z-gauge flag 1820. Also visible in FIG. 18 is a probe 1802 that has a probe crash flag 1858 connected with it. The probe 1802 may be captured by the probe holder assembly 1806 such that the probe 1802 may move vertically within the probe holder assembly 1806 if the tip of the probe 1802 is pushed upwards, and the tip of the probe 1802 may pass into and through a wash station 1804 when the probe is extended. The probe holder assembly 1806 may have a probe crash sensor 1860 that may detect when the probe 1802 has crashed, e.g., by virtue of the probe crash flag 1858 blocking the probe crash sensor 1860. A base assembly 1845 is shown as a dashed outline and represents a stationary frame of reference for this discussion—each of the following Figures has the base assembly 1845 in the same position. A sample tube 1866 with a sample 1823 is shown positioned beneath the depicted sampler and remains fixed in spaced, similar to the base assembly 1845, in each subsequent Figure.

FIG. 19 is a schematic view of the example sampler of FIG. 18 with the z-gauge assembly set to a specific height. In FIG. 19, the z-gauge assembly 1822 has been moved down to a specified height that is sufficiently high that the sled 1814 will not, in theory, collide with the sample tube 1866 when in the second bottomed-out position. As can be seen, the z-gauge flag 1820 now blocks the z-gauge sensor 1832, thereby indicating that the sled 1814 is not in the second bottomed-out position. The probe holder flag 1838, however, still indicates that the sled 1814 is in the first bottomed-out position with respect to probe holder assembly 1806.

Figure 20:
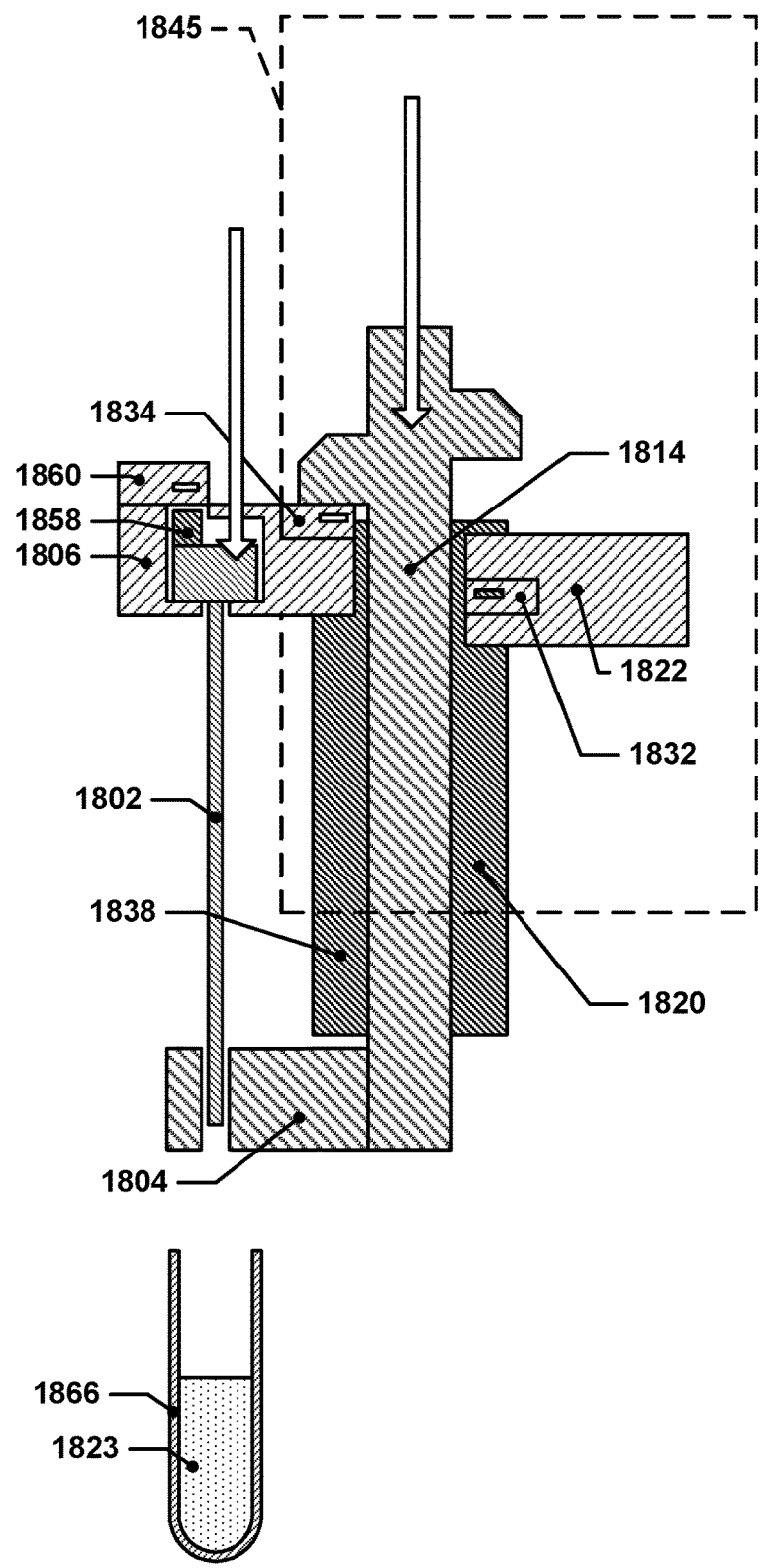
FIG. 20 is a schematic view of the example sampler of FIG. 18 with the probe holder assembly traveling downwards and the sled in a first bottomed-out position relative to the probe holder assembly.

FIG. 20 is a schematic view of the example sampler of FIG. 18 with the probe holder assembly traveling downwards and the sled in a first bottomed-out position relative to the probe holder assembly. In FIG. 20, both the probe holder assembly 1806 and the sled 1814 travel downwards in tandem. As can be seen, the z-gauge flag 1820 still blocks the z-gauge sensor 1832, thereby indicating that the sled 1814 is not in the second bottomed-out position, and the probe holder flag 1838 still indicates that the sled 1814 is in the first bottomed-out position with respect to probe holder assembly 1806.

Figure 21:
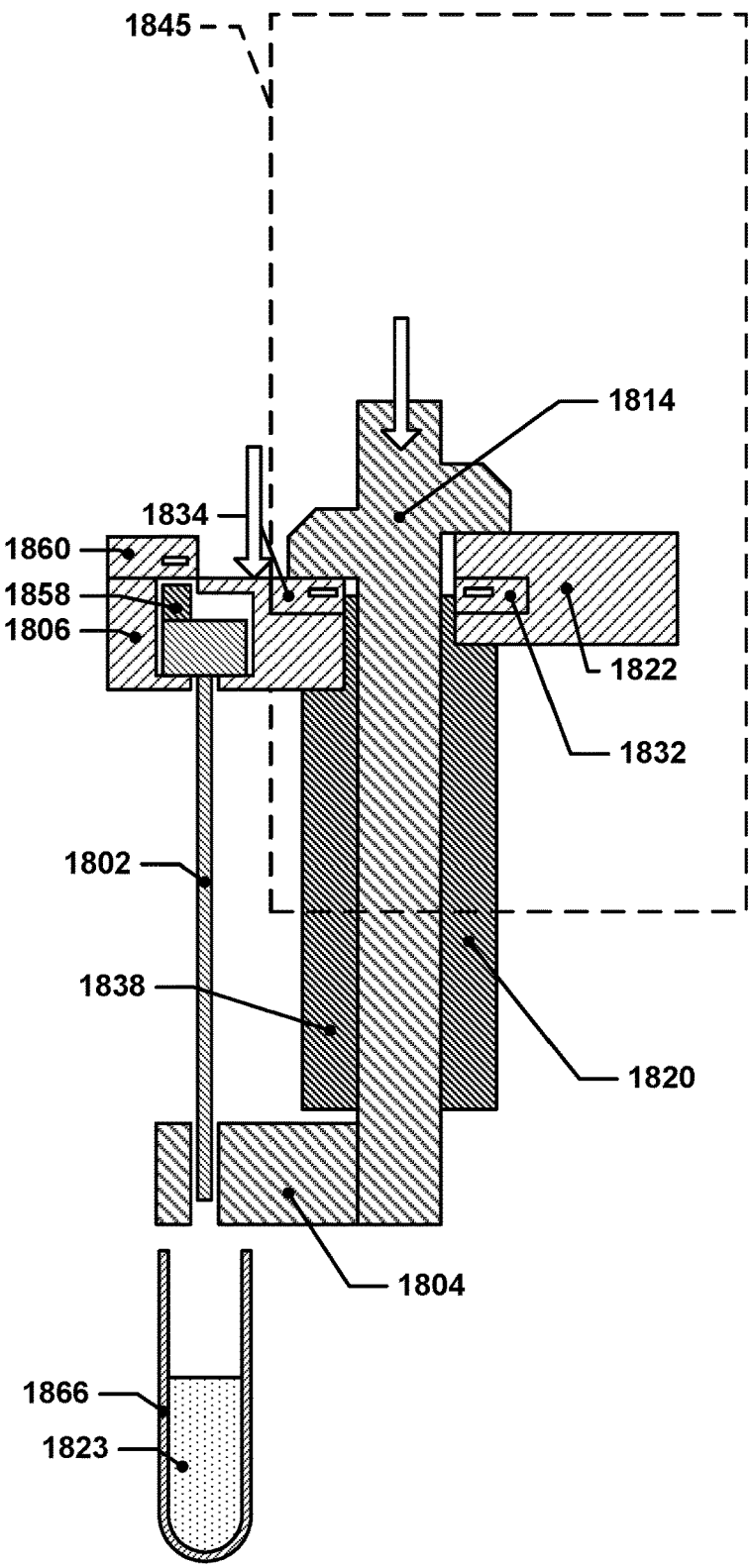
FIG. 21 is a schematic view of the example sampler of FIG. 18 with the sled in the first bottomed-out position relative to the probe holder assembly and in a second bottomed-out position relative to the z-gauge assembly.

FIG. 21 is a schematic view of the example sampler of FIG. 18 with the sled in the first bottomed-out position relative to the probe holder assembly and in a second bottomed-out position relative to the z-gauge assembly. Neither the z-gauge flag 1820 nor the probe holder flag # ZZ38 block the z-gauge sensor 1832 or the probe holder sensor 1834, respectively, thereby indicating that the sled 1814 is in the second bottomed-out position and the first bottomed-out position simultaneously. This depicted configuration represents the "hand-off" of the sled 1814 from the probe holder assembly 1806 to the z-gauge assembly 1822. Subsequent downward movement of the probe holder assembly 1806 will occur without further downward movement of the sled 1814, as the sled 1814 is now in the second bottomed-out position. As can be seen, the wash station 1804 is positioned close to, but not contacting, the sample tube 1866 due to the positioning of the z-gauge assembly 1822.

Figure 22:
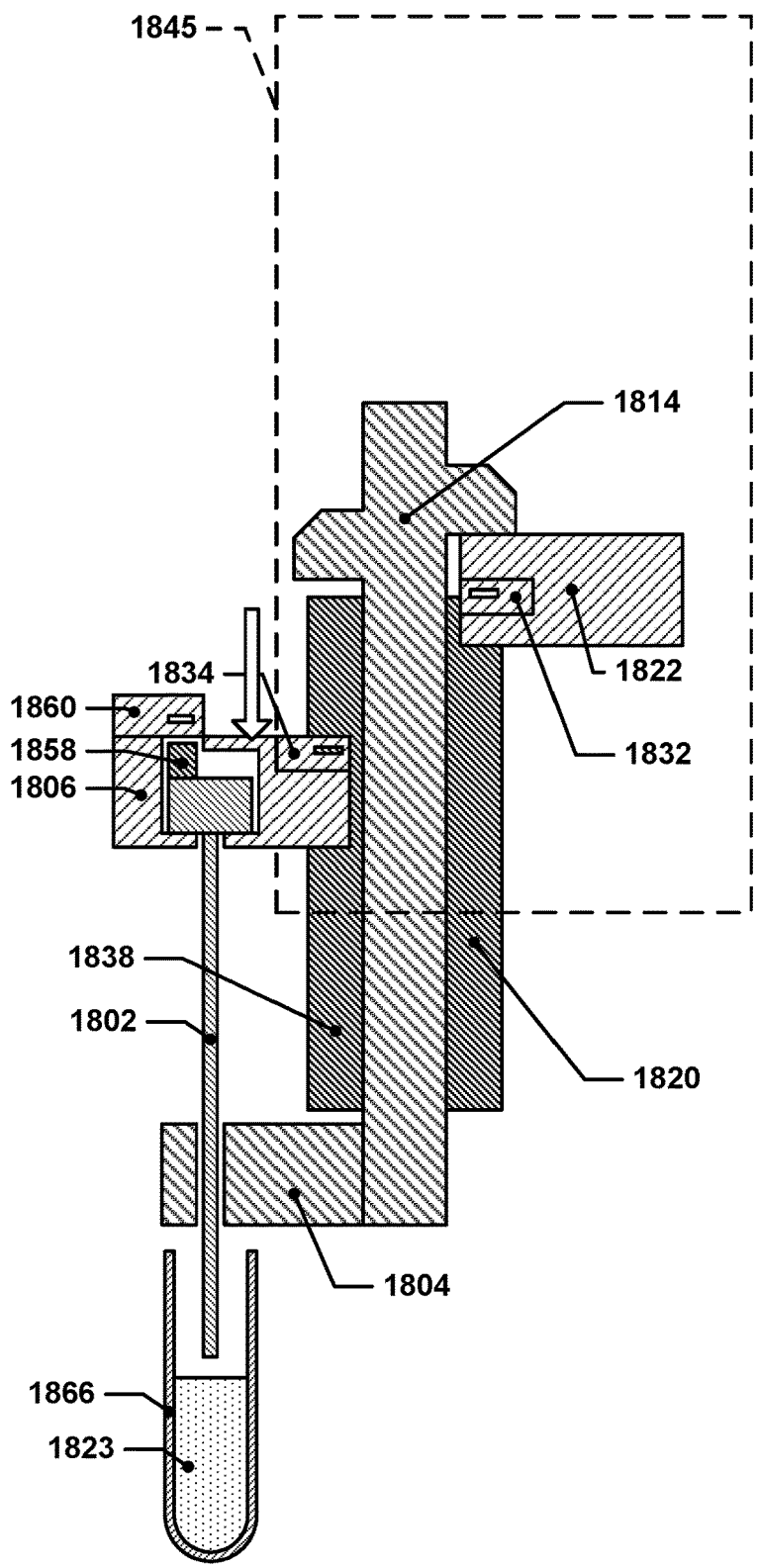
FIG. 22 is a schematic view of the example sampler of FIG. 18 with the sled in the second bottomed-out position relative to the z-gauge assembly and the probe holder assembly in a lower position than in FIG. 21.

FIG. 22 is a schematic view of the example sampler of FIG. 18 with the sled in the second bottomed-out position relative to the z-gauge assembly and the probe holder assembly in a lower position than in FIG. 21. As can be seen, further downward movement of the probe holder assembly 1806 causes the probe 1802 to extend out of the wash station 1804 and into the sample tube 1866.

Figure 23:
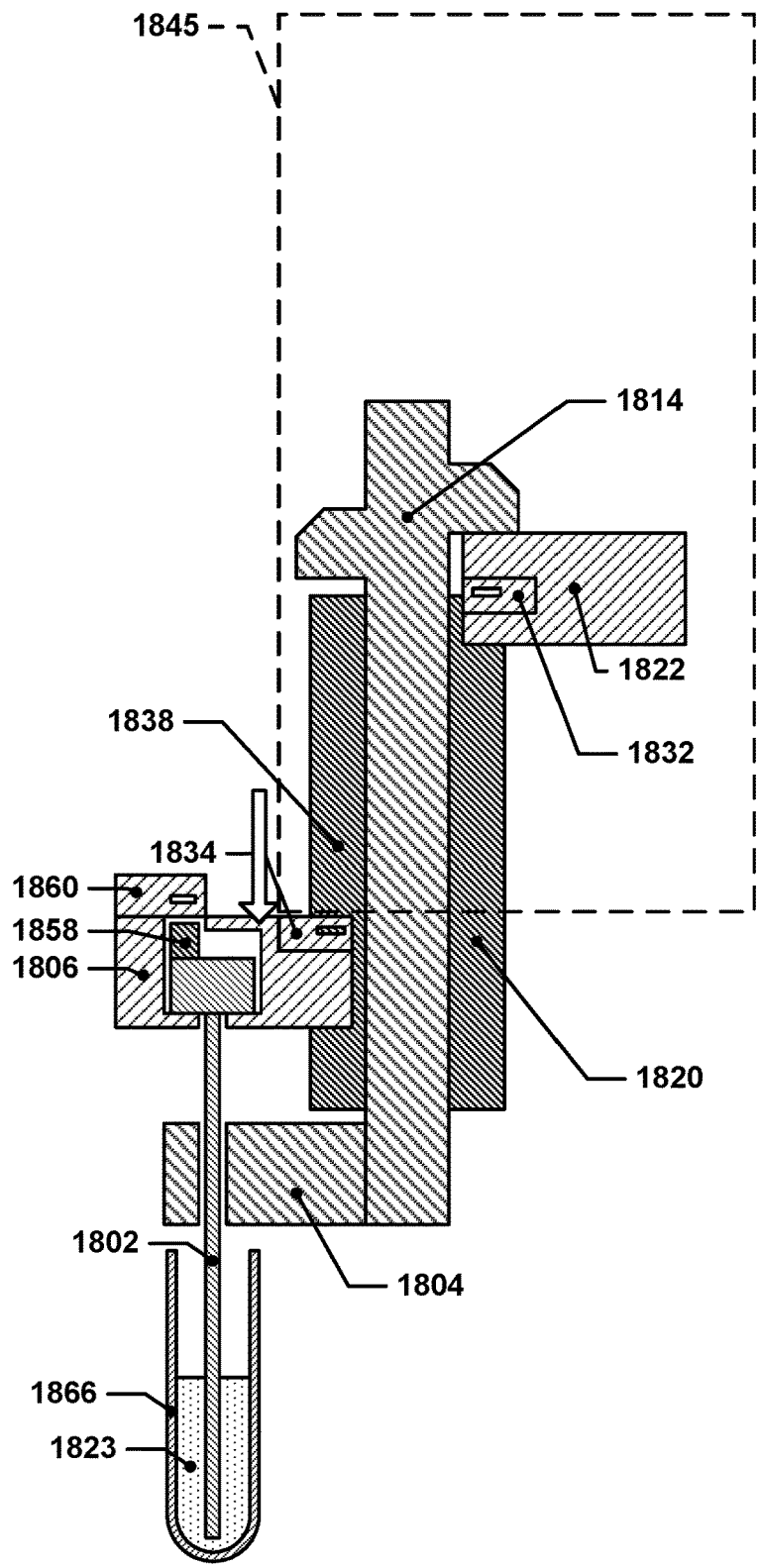
FIG. 23 is a schematic view of the example sampler of FIG. 18 with the probe extended into a sample tube to take a sample.

FIG. 23 is a schematic view of the example sampler of FIG. 18 with the probe extended into a sample tube to take a sample. In FIG. 23, the probe holder assembly 1806 has been moved to a sampling height, thereby placing the probe 1802 tip near the bottom of the sample tube 1866 to facilitate obtaining a sample. After the sample is obtained, the above movements illustrated in FIG. 20 and some of the movements illustrated in FIG. 21 may be repeated in reverse before obtaining a sample from another sample tube 1866 in another location.

Figure 24:
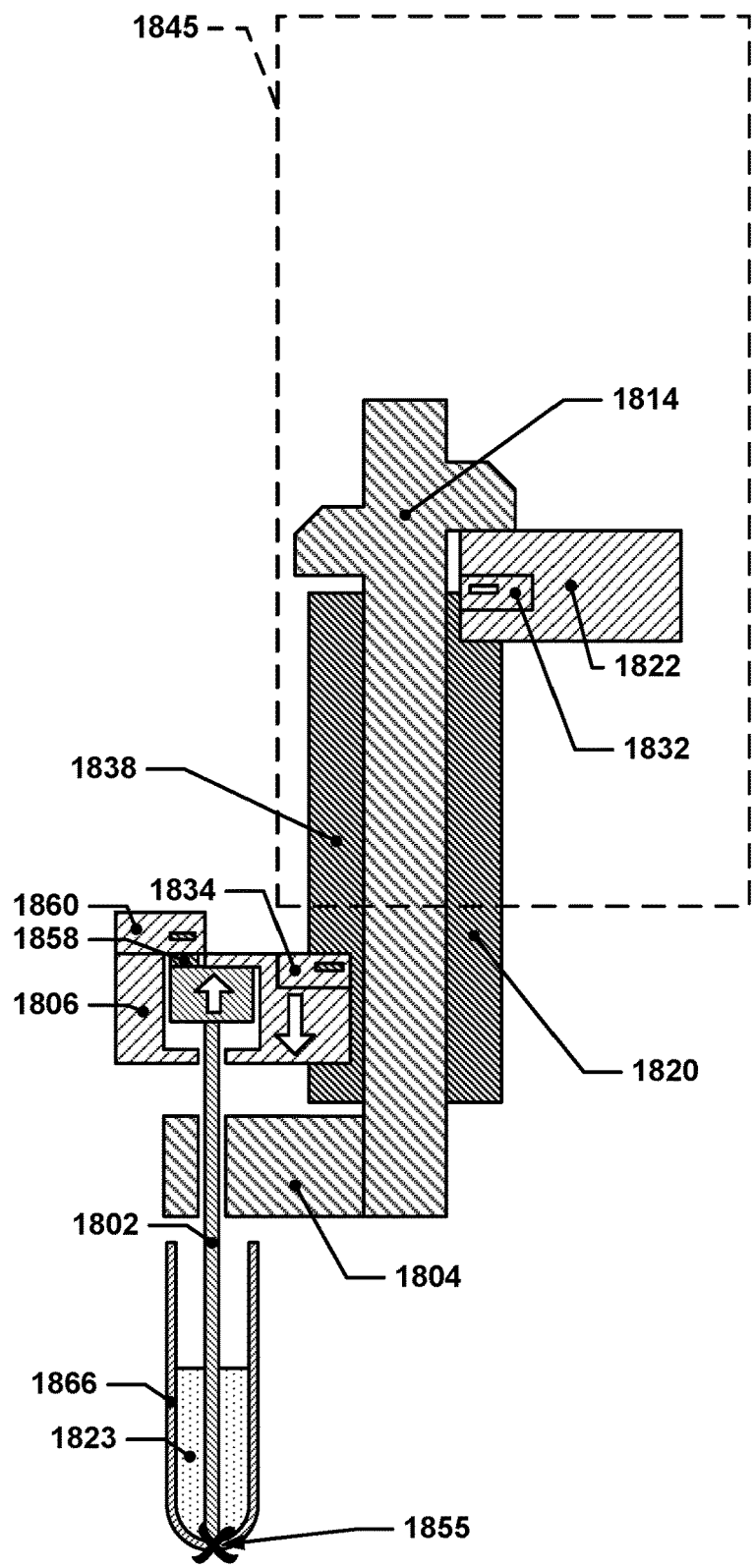
FIG. 24 is a schematic view of the example sampler of FIG. 18 with the probe extended far enough that it has collided with the sample tube.

FIG. 24 is a schematic view of the example sampler of FIG. 18 with the probe extended far enough that it has collided 1855 with the sample tube. As can be seen, the collision of the probe 1802 with the bottom of the sample tube 1866 has pushed the probe 1802 and the probe crash flag 1858 upwards, such that the probe crash sensor 1860 is blocked by the probe crash flag 1858, thereby generating a probe crash signal.

Figure 25:
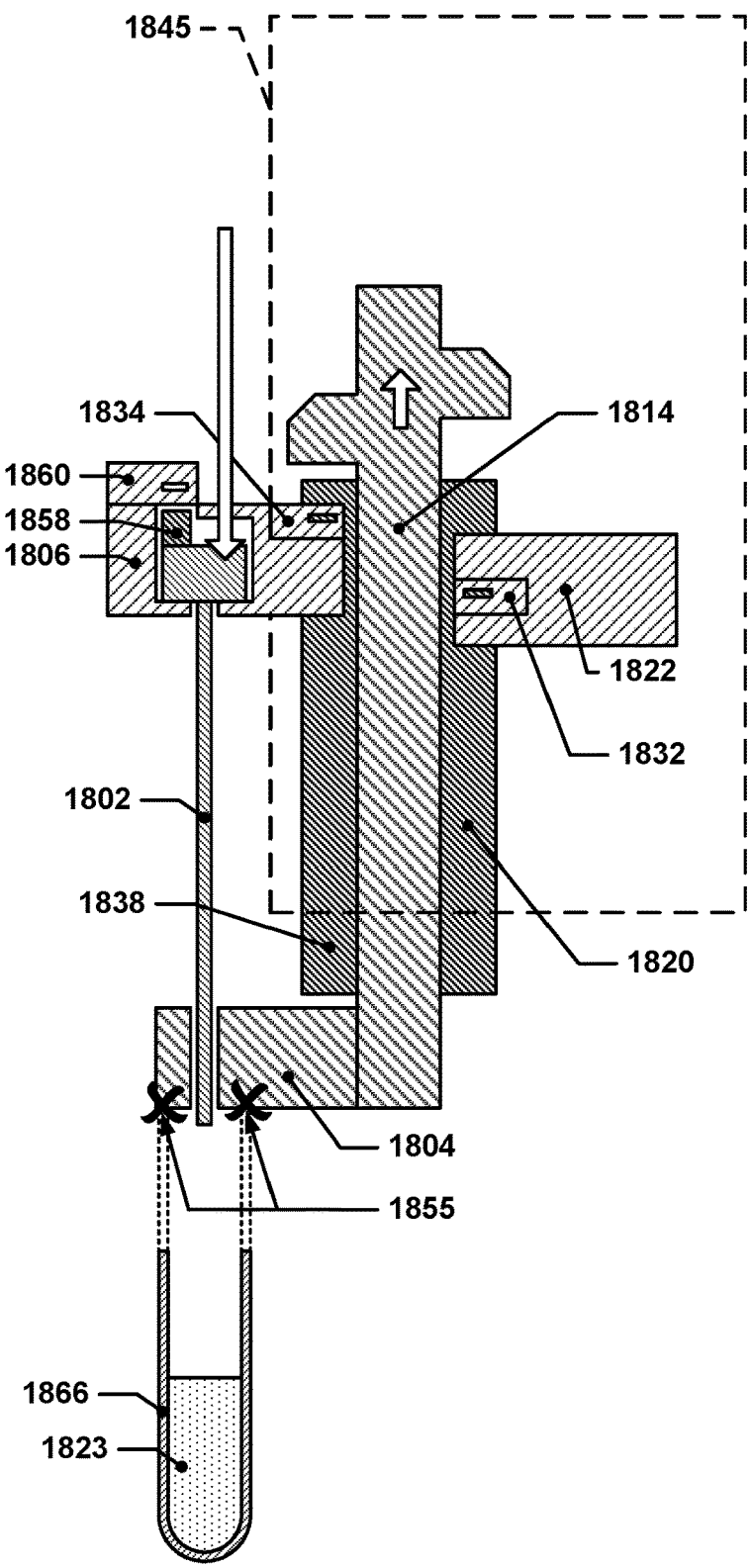
FIG. 25 is a schematic view of the example sampler of FIG. 18 showing a fault condition in which the wash station has collided with an incorrectly sized sample tube.

FIG. 25 is a schematic view of the example sampler of FIG. 18 showing a fault condition in which the wash station has collided with an incorrectly sized sample tube. In FIG. 25, an over-size sample tube 1866 is indicated by the dotted outline. The wash station 1804 has collided 1855 with the over-size sample tube 1866 during lowering of the sled 1804 due to the z-gauge assembly being set for the lower expected sample tube height. This causes the sled 1814 to simultaneously be in neither the first bottomed-out position nor the second bottomed-out position, which may be detected by the probe holder sensor 1834 and the z-gauge sensor 1832.

The concepts described above may provide several benefits. For example, having a wash station that travels with the probe and can wash the probe simultaneously with the withdrawal of the probe from a sample container may drastically reduce the amount of time required to obtain a sample, thereby increasing throughput efficiency. Furthermore, the use of a z-gauge assembly and a probe holder assembly in conjunction with a sled, as discussed above, may allow for independent control of the wash station height and the probe height during sampling operations. An even further benefit may be realized if some or all of the various sensor systems discussed herein are implemented, as such sensors may be used to mitigate crash situations.

The foregoing description of the invention has been presented for purposes of illustration and description. It is not intended to be exhaustive or to limit the invention to the precise form disclosed, and other modifications and variations may be possible in light of the above teachings. The implementation was chosen and described in order to best explain the principles of the invention and its practical application to thereby enable others skilled in the art to best utilize the invention in various implementations and various modifications as are suited to the particular use contemplated. It is intended that the appended claims be construed to include other alternative implementations of the invention except insofar as limited by the prior art.

What is claimed is:

1. An apparatus comprising:
    a base assembly;
    a sled movably coupled with the base assembly, wherein the sled:
        is configured to translate relative to the base assembly along a first axis, and
        includes a wash station with a passage that extends along an axis parallel to the first axis and passes through the wash station;
    a probe holder assembly movably coupled with the base assembly, wherein the probe holder assembly is configured to:
        translate in a first direction relative to the base assembly along the first axis and in a second direction opposite the first direction relative to the base assembly along the first axis, and
        receive a probe such that the probe, when installed in the probe holder assembly, passes through the passage in the wash station during at least some translation along the first axis of the probe holder assembly relative to the sled, wherein the probe holder assembly has a first surface that prevents the sled from moving past a first bottomed-out position relative to the probe holder assembly when the sled is translated in the first direction relative to the probe holder assembly, and wherein the sled is in contact with the first surface when in the first bottomed-out position;
    a z-gauge assembly movably coupled with the base assembly, wherein the z-gauge assembly has a second surface that prevents the sled from moving past a second bottomed-out position relative to the z-gauge assembly when the sled is translated in the first direction along the first axis relative to the z-gauge assembly, wherein the sled is in contact with the second surface when in the second bottomed-out position, and the z-gauge assembly is configured to translate relative to the base assembly along the first axis;
    a probe holder sensor configured to detect when the sled is substantially in the first bottomed-out position relative to the probe holder assembly; and
    a z-gauge sensor configured to detect when the sled is substantially in the second bottomed-out position relative to the z-gauge assembly.

2. The apparatus of claim 1, further comprising:
a probe holder assembly linear actuator that is configured to cause the probe holder assembly to translate along the first axis; and
a z-gauge assembly linear actuator that is configured to cause the z-gauge assembly to translate along the first axis.

3. The apparatus of claim 2, further comprising a probe crash sensor located in the probe holder assembly and configured to detect when the probe, when the probe is installed in the probe holder assembly, moves at least a first distance relative to the probe holder assembly.

4. The apparatus of claim 3, wherein:
the probe crash sensor is an optical sensor that includes a light source and a photodetector and configured to direct light from the light source towards the photodetector by crossing a gap, the probe holder assembly further includes a probe adapter that is configured to mate with the probe when the probe is installed, and
the probe adapter includes a probe crash flag that does not block light from the light source of the probe crash sensor from reaching the photodetector of the probe crash sensor when the probe adapter is in a lowered position relative to the probe holder assembly and that blocks light from the light source of the probe crash sensor from reaching the photodetector of the probe crash sensor when the probe adapter is in a raised position relative to the probe holder assembly.

5. The apparatus of claim 3, further comprising a controller, the controller including:
one or more processors, and
a memory, wherein:
the one or more processors are operatively connected with the memory, and
the memory stores computer-executable instructions for controlling the one or more processors to:
monitor signals from the crash probe sensor, and
generate a probe drive control signal to cause the probe holder assembly linear actuator to translate the probe holder assembly upwards responsive to the signals from the crash probe sensor indicating that the probe has moved relative to the probe holder assembly.

6. The apparatus of claim 2, further comprising a controller, the controller including:
one or more processors, and
a memory, wherein:
the one or more processors are operatively connected with the memory, and
the memory stores computer-executable instructions for controlling the one or more processors to:
monitor signals from the probe holder sensor,
monitor signals from the z-gauge sensor, and
generate a z-gauge drive control signal to cause the z-gauge linear actuator to translate the z-gauge assembly upwards responsive to the signals from the probe holder sensor and the z-gauge sensor indicating that the sled is in neither the first bottomed-out position nor the second bottomed-out position.

7. The apparatus of claim 6, wherein the memory further stores computer-executable instructions for further controlling the one or more processors to generate an error signal responsive to the signals from the probe holder sensor and the z-gauge sensor indicating that the sled is in neither first bottomed-out position nor the second bottomed-out position.

8. The apparatus of claim 6, further comprising a user input device, wherein the memory stores further computer-executable instructions for further controlling the one or more processors to:
receive a user input signal from the user input device indicative of a particular sample tube size,
access a database of sample tube information,
determine, from the database of sample tube information, a z-gauge height setting and a probe holder assembly height setting for the particular sample tube size from the database of sample tube information,
generate a z-gauge drive control signal to cause the z-gauge linear actuator to move the z-gauge assembly to a first height corresponding to the z-gauge height setting, and
generate, subsequent to causing the z-gauge linear actuator to move to the z-gauge assembly to the first height, a probe drive control signal to cause the probe holder assembly linear actuator to move the probe holder assembly to a second height corresponding to the probe holder assembly height.

9. The apparatus of claim 2, wherein:
the probe holder assembly linear actuator includes:
a z-gauge drive screw configured to translate the z-gauge assembly relative to the base assembly when rotated, and
a z-gauge drive screw motor configured to rotate the z-gauge drive screw responsive to receipt of a z-gauge control signal; and
the z-gauge assembly linear actuator includes:
a probe drive screw configured to translate the probe holder assembly relative to the base assembly when rotated, and
a probe drive screw motor configured to rotate the probe drive screw responsive to receipt of a probe drive control signal.

10. The apparatus of claim 1, wherein the probe holder sensor and the z-gauge sensor are both optical sensors, each optical sensor including a light source and a photodetector and configured to direct light from the light source towards the photodetector by crossing a gap, the apparatus further comprising:
a probe holder flag that blocks light from the light source of the probe holder sensor from reaching the photodetector of the probe holder sensor except when the sled is in the first bottomed out position, and
a z-gauge flag that blocks light from the light source of the z-gauge sensor from reaching the photodetector of the z-gauge sensor except when the sled is in the second bottomed out position.

11. The apparatus of claim 1, wherein wash station includes:
a wash fluid inlet;
a wash fluid exit nozzle;
a wash chamber; and
a probe opening, wherein:
the passage includes the wash chamber and the probe opening,
the wash fluid inlet is configured to direct fluid flowed through the wash fluid inlet into the wash chamber along a direction offset from a centerline of the probe when the probe is installed in the probe holder assembly,
the wash fluid exit nozzle is positioned lower than the probe opening, and
the probe opening has a smaller cross-section when viewed along the first axis than the wash chamber.

12. The apparatus of claim 1, further comprising a z-gauge home sensor configured to detect when the z-gauge assembly is at a pre-set home position relative to the base assembly.

13. The apparatus of claim 12, wherein the z-gauge home sensor is an optical sensor that includes a light source and a photodetector and configured to direct light from the light source towards the photodetector by crossing a gap, and the apparatus further comprises a z-gauge home flag that blocks light from the light source of the z-gauge home sensor from reaching the photodetector of the z-gauge home sensor only when the z-gauge assembly is in the pre-set home position relative to the base assembly.

14. The apparatus of claim 1, wherein the sled and the probe holder assembly are both mounted to a linear guide rail.

15. The apparatus of claim 14, wherein:
the sled is connected with the linear guide rail by an upper slide,
the probe holder assembly is connected with the linear guide rail by a lower slide,
the sled includes an elongate slot with a long axis parallel to the first axis,
the sled is interposed between the linear guide rail and the probe holder assembly, and
the lower slide passes through the elongate slot.

16. A non-transitory, machine-readable storage medium storing computer-executable instructions for causing one or more processors to:
send a z-gauge drive signal to a z-gauge linear actuator to cause the z-gauge linear actuator to move a z-gauge assembly of a sampler apparatus to a first height,
send a probe drive signal to a probe holder assembly linear actuator to cause the probe holder assembly linear actuator to move a probe holder assembly of the sampler apparatus to a second height,
monitor signals from a probe holder sensor,
monitor signals from a z-gauge sensor, and
send a further z-gauge drive signal to the z-gauge linear actuator to cause the z-gauge linear actuator to move the z-gauge assembly upwards responsive to the signals from the probe holder sensor and the z-gauge sensor indicating that a sled of the sampler apparatus is neither in a first bottomed-out position relative to the probe holder assembly nor in a second bottomed-out position relative to the z-gauge assembly.

17. The non-transitory, machine-readable storage medium of claim 16, further storing computer-executable instructions for causing one or more processors to:
monitor signals from a probe crash sensor, and
send a further probe drive signal to the probe holder assembly linear actuator to cause the probe holder assembly linear actuator to move the probe holder assembly upwards responsive to the signals from the probe crash sensor indicating that a probe of the sample apparatus has moved relative to the probe holder assembly.

18. The non-transitory, machine-readable storage medium of claim 16, further storing computer-executable instructions for causing one or more processors to:
receive a user input signal indicative of a particular sample tube size,
access a database of sample tube information, and
determine, from the database of sample tube information, a z-gauge height setting and a probe holder assembly height setting for the particular sample tube size from the database of sample tube information, wherein the first height corresponds with the z-gauge height setting and the second height corresponds with the probe holder assembly.

* * * * *